United States Patent
Matsuda et al.

(10) Patent No.: US 7,302,467 B2
(45) Date of Patent: Nov. 27, 2007

(54) INFORMATION PROCESSING DEVICE AND INFORMATION PROCESSING METHOD, SERVICE PROVIDING SYSTEM, AND COMPUTER-EXECUTABLE PROGRAM FOR THE SAME

(75) Inventors: Satoru Matsuda, Kanagawa (JP); Katsushige Hata, Tokyo (JP); Teruhisa Kamachi, Tokyo (JP)

(73) Assignee: Sony Corporation, Tokyo (JP)

( * ) Notice: Subject to any disclaimer, the term of this patent is extended or adjusted under 35 U.S.C. 154(b) by 796 days.

(21) Appl. No.: 09/924,621

(22) Filed: Aug. 7, 2001

(65) Prior Publication Data

US 2002/0082905 A1   Jun. 27, 2002

(30) Foreign Application Priority Data

Aug. 7, 2000   (JP)   ............................ P2000-238440

(51) Int. Cl.
  G06F 15/16   (2006.01)
(52) U.S. Cl. ...................... 709/204; 709/205; 709/229; 709/249
(58) Field of Classification Search ................ 709/229, 709/201–207, 245, 238, 249; 705/10, 9, 705/26, 27, 37, 59
See application file for complete search history.

(56) References Cited

U.S. PATENT DOCUMENTS

| | | | |
|---|---|---|---|
| 5,813,010 A * | 9/1998 | Kurano et al. .............. | 707/100 |
| 6,078,949 A * | 6/2000 | Quinlan ...................... | 709/215 |
| 6,093,104 A * | 7/2000 | Kasahara et al. ............. | 463/30 |
| 6,182,891 B1 * | 2/2001 | Furuhashi et al. .......... | 235/379 |
| 6,282,183 B1 * | 8/2001 | Harris et al. ................. | 370/338 |
| 6,351,738 B1 * | 2/2002 | Clark .......................... | 705/37 |
| 6,400,996 B1 * | 6/2002 | Hoffberg et al. .............. | 700/83 |
| 6,567,822 B1 * | 5/2003 | Cudahy et al. .......... | 707/104.1 |
| 6,658,568 B1 * | 12/2003 | Ginter et al. ................ | 713/193 |
| 6,778,872 B2 * | 8/2004 | Jorgenson et al. .......... | 700/106 |
| 6,816,884 B1 * | 11/2004 | Summers ..................... | 709/206 |
| 6,947,903 B1 * | 9/2005 | Perry ........................... | 705/28 |
| 6,959,384 B1 * | 10/2005 | Serret-Avila ................ | 713/176 |
| 7,069,249 B2 * | 6/2006 | Stolfo et al. .................. | 705/74 |

* cited by examiner

*Primary Examiner*—Nathan J. Flynn
*Assistant Examiner*—Mohammad Siddiqi
(74) *Attorney, Agent, or Firm*—Bell Boyd & Lloyd LLP

(57) ABSTRACT

A community, which is a group of users having common interests, has attributes such as the name of the community, the interests shared, the number of members, average age of the members, gender ratio of the members, and so forth. Corporations provide services to the users of a community to which the corporations have permission to access. The corporations can know a portion of the attribute information of the community, but cannot know the personal information of the individual users. Distribution firms can obtain personal information of users belonging to a community and deliver merchandise thereto, by entering into contract with that community. The distribution firms receive merchandise shipping commissions using serial numbers, so there is no exchange of personal information between the corporations and the distribution firms. Accordingly, services can be provided from corporations to users without disclosing personal information of the users to the corporations.

2 Claims, 11 Drawing Sheets

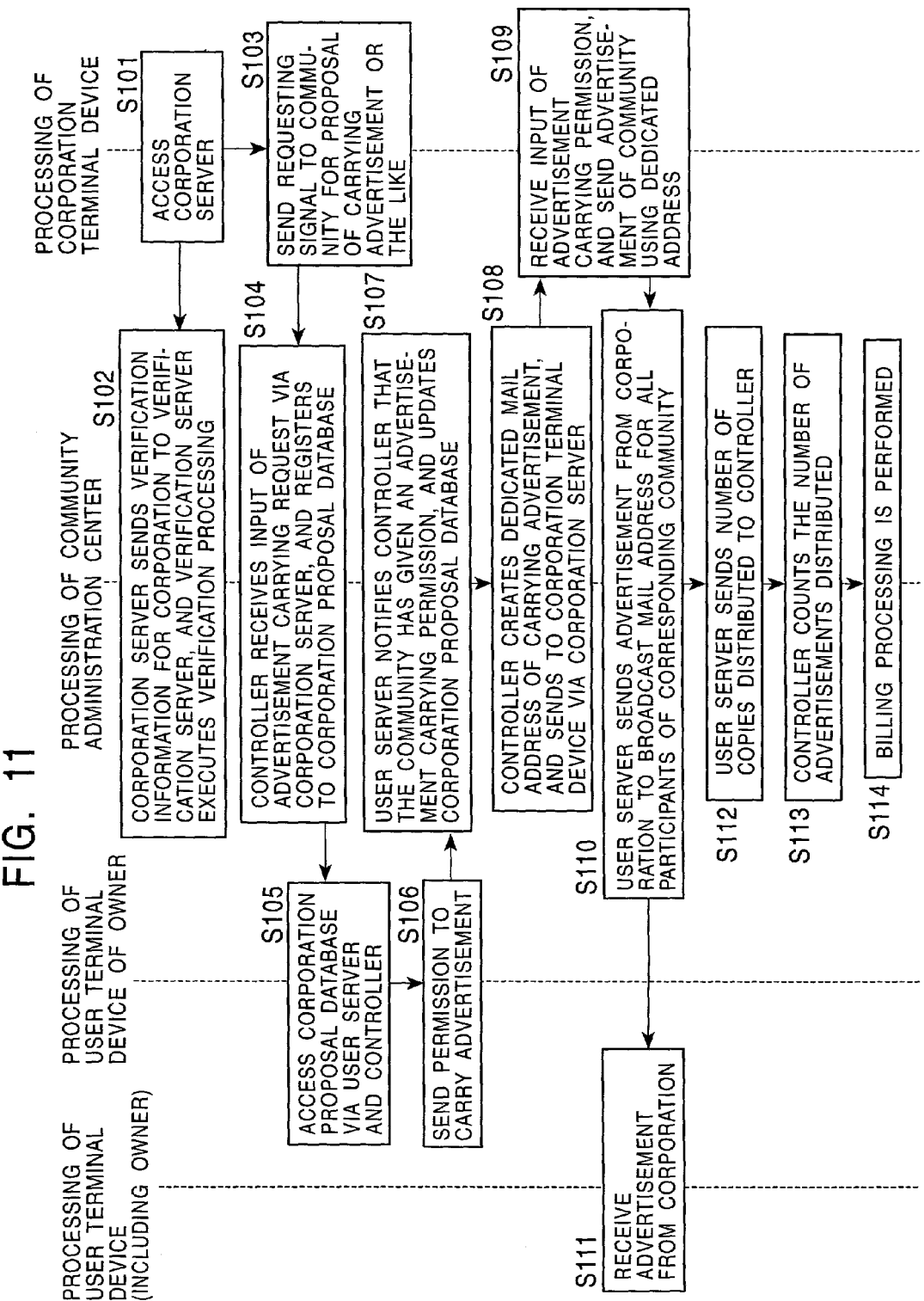

INFORMATION PROCESSING DEVICE AND INFORMATION PROCESSING METHOD, SERVICE PROVIDING SYSTEM, AND COMPUTER-EXECUTABLE PROGRAM FOR THE SAME

BACKGROUND OF THE INVENTION

1. Field of the Invention

The present invention relates to an information processing device and information processing method, a service providing system, and a computer-executable program, and particularly relates to an information processing device and information processing method, a service providing system, and a computer-executable program, enabling individuals to exchange information with corporations and order merchandise via a community which is a group of individuals sharing common interests and objects, without disclosing personal information to the corporations, thereby enabling corporations to transmit advertisements to individuals or take questionnaires for example, via the community, so that the corporations can target market segments without checking personal information.

2. Description of the Related Art

Recent advancements in the Internet have come to allow users to order merchandise from corporations through e-mail or Web contents, send questions and requests to corporations and receive replies, and so forth. Also, corporations have come to carry out questionnaires, run advertisements introducing merchandise or services, and so forth, through e-mail or Web contents.

However, in the event that an individual orders merchandise from a corporation using e-mail or Web contents as the medium for the transaction, the individual must notify the corporation not only of his/her e-mail address, but must also provide personal information such as address, name, telephone number, and if necessary, credit card number, over the Internet. Consumers have shown some resistance to disclosing such personal information over the Internet. Also, in cases where the user sends messages such as questions or requests by e-mail, in which he or she requests a reply, the user is thereby disclosing his/her e-mail address to the corporation.

Further, in the event of corporations carrying out questionnaires with individuals or introducing products or services, the corporations would like to target a specific market segment in order to carry out questionnaires in a meaningful manner or place advertisements effectively, while keeping costs down. However, this requires personal information such as the age, sex, interest, etc., of the object, but the consumer often feels uneasy about giving corporations such personal information.

Also, conventionally, merchandise and services have been planned and marketed by the corporations, so even in the event that individuals make proposals for merchandise and services to the corporations, this was seldom realized, since the corporations could not foresee a great amount being sold. In the same way, in the event that several individuals wanted to join to buy already-existing merchandise in bulk, there has been the problem that it is troublesome to get enough members together.

For example, in the event that a corporations sends an e-mail to an individual introducing a product or a service as part of an advertising campaign, the user may welcome the advertisement if it deals with a field in which the user is interested and the product is beneficial to the user. On the other hand, the user might feel that such as advertisement is itself an invasion of privacy. This would lead to a counterproductive result in which the corporate image is diminished in the eyes of the user. However, until now there have been no reliable and unintrusive ways in which corporations could learn the types of information individual recipient users desired.

SUMMARY OF THE INVENTION

The present invention has been made in light of the above, and accordingly, it is an object of the present invention to enable individuals to exchange information with corporations via a community which is a group of individuals sharing common interests and objects, without requiring the individual to disclose personal information to the corporations, and to enable corporations to transmit advertisements to individuals or issue questionnaires for example, via the community, so that the corporations can target market segments without checking the personal information of the individual members of the community.

It is another object of the present invention to allow communities which are groups of individuals having common interests and objects to make proposals to corporations or for corporations to make proposals to the community, thereby enabling the members of the community to receive services which were not readily available to individuals as such. Thus, the corporations can learn the needs of the consumers without mistake, and place advertisements in an effective manner. Further, by providing a third-party organization for monitoring the activity of the community the corporations may obtain reliable information about the community without learning the personal information of the members of the community, so contracts between the community and the corporation can be realized smoothly.

To this end, according to a first aspect of the present invention, an information processing device is provided which exchanges information with other information processing devices via a network. The information processing device includes a first input/output controller for controlling input and output of information to and from a first other information processing device operated by a user and a second input/output controller for controlling input and output of information to and from a second other information processing device. The first input/output controller controls the input of a first set of information corresponding to the personal information of the user, and a substitution takes place wherein personal information of the user contained in the first set of information is substituted with second information corresponding to the personal information of the user on a one-to-one basis. A recording controller controls recording of the personal information of the user and the second information such that the personal information of the user and the second information are recorded in a corresponding manner. The user is registered as a member of a predetermined group, and the second information is determined corresponding to the group. The second input/output controller controls the output of the first information to the second other information processing device, wherein the personal information of the user is substituted with the second information.

The personal information of the user may be, for example, an e-mail address of the user.

The information processing device may further include a generator for generating the second set of information using a hash function, or may further comprise searching function for searching the operational information of the user, the recording of which is controlled by the first recording means based on the second set of information contained in a third set of information which is a reply to the first set of information, the input of which is controlled by the second input/output controller. The first input/output controller controls the output of the third set of information to the first other information processing device, based on the personal information of the users searched by the searching function.

The information processing device may further include a second recording controller for controlling the recording of personal attribute information of the user, and a third recording controller for controlling recording of information identifying the group and attribute information of the group. The attribute information of the group contains a predetermined number of sets of personal attribute information common to a plurality of the users registered to the group, in descending order of degree held in common, wherein the personal attribute information is that which the recording of which is controlled by the second recording controller.

The information processing device may further provide a verifier for verifying permission for access to the attribute information of the group regarding which recording is controlled by the third recording control means. The verifier verifies permission for accessing to the attribute information of the group based on a contract between the group and the holder of the second other information processing device. This information processing device may further include a search function for searching for the attribute information of the group regarding which recording is controlled by the third recording control means, based on information for identifying the group regarding which input is controlled by the second input/output controller, in the event that the verifier verifies the permission to access of the second other information processing device, wherein the second input/output controller controls the output of the attribute information of the group searched by the searching means, to the second other information processing device. The information processing device may further comprise a searching function for searching for information for identifying the group regarding which recording is controlled by the third recording controller, based on information corresponding to the attribute information of the group contained in a fourth set of information regarding which input is controlled by the second input/output controller, in the event that the verifier verifies the permission to access of the second other information processing device.

The second input/output controller may control the output of information for identifying the group searched by the search function to the second other information processing device, and the first input/output controller may control output of the fourth set of information to the first other information processing device which the user registered to the group has, based on information for identifying the group searched by the search function.

The information processing device may further provide a third input/output controller for controlling the input and output of information to and from a third other information processing device. A permission verifier is provided for verifying permission to access personal attribute information of the user regarding which recording is controlled by the second recording controller. A first searching function is provided for searching the personal attribute information of the user regarding which recording is controlled by the second recording controller, based on a fifth set of information regarding which input is controlled by the third input/output controller, in the event that the permission verifier verifies permission to access a third other information processing device. The third input/output controller controls the output of the personal attribute information of the user searched by the first searching function to the third other information processing device. The permission verifier may verify permission for access to the personal attribute information of the user registered to the group, based on a contract between the holder of the third other information processing device and the group.

This information processing device may further provide a second searching function for searching for the holder of the third other information processing device which has entered into contract with the group, based on the second information regarding which input is controlled by the second input/output controller.

According to a second aspect of the present invention, an information processing method for an information processing device which exchanges information with other information processing devices via a network includes the steps defined below. A first input/output control step is provided for controlling the input and output of information to and from a first other information processing device held by a user. A second input/output control step controls the input and output of information to and from a second other information processing device. A substituting step is provided for substituting personal information of the user contained in a first set of information, the input of which is controlled by the processing of the first input/output control step with a second set of information corresponding to the personal information of the user on a one-to-one basis. A first recording control step is provided for controlling the recording of the personal information of the user and the second set of information such that the personal information of the user and the second set of information are recorded in a corresponding manner. The method of the invention may be practiced when the user is registered as a member of a predetermined group, the second set of information is determined corresponding to the group, and the output of the first set of information to the second other information processing device is controlled in the second input/output control step, wherein the personal information of the user is substituted with the second information by the processing of the substituting step.

According to a third aspect of the present invention, a program is provided for an information processing device which exchanges information with other information processing devices via a network. The program provides software code for performing the following steps. A first input/output control step for controlling the input and output of information to and from a first other information processing device of a user. A second input/output control step for controlling the input and output of information to and from a second other information processing device. A substituting step for substituting personal information of the user contained in a first set of information, the input of which is controlled by the processing of the first input/output control step with a second set of information corresponding to the personal information of the user on a one-to-one basis. A first recording control step for controlling recording of the personal information of the user and the second set of information such that the personal information of the user and the second set of information are recorded in a corresponding manner, wherein the user is registered as a member of a predetermined group, the second set of information is determined corresponding to the group, and output of the first set of information to the second other information processing device is controlled in the second input/output control step, wherein the personal information of the user is substituted with the second set of information by the substituting step.

According to a fourth aspect of the present invention, a service providing system includes: a first information processing device which exchanges information with other information processing devices via a network. The system also includes a second information processing device of a user, and a third information processing device of a corporation. The first information processing device includes a first input/output controller for controlling the input and output of information to and from the second information processing device, and a second input/output controller for controlling the input and output of information to and from the third information processing device. The first information processing device performs a substitution wherein personal information of the user contained in a first set of information of which input is controlled by the first input/output control means is substituted with a second set of information corresponding to the personal information of the user on a one-to-one basis. The first information processing device also includes a first recording controller for controlling the recording of the personal information of the user and the second set of information such that the personal information of the user and the second set of information are recorded in a corresponding manner, wherein the user is registered as a member of a predetermined group, the second set of information is determined corresponding to the group, the second input/output controller controls the output to the third information processing device of the first set of information wherein the personal information of the user is substituted with the second information by the substitution. The second information processing device includes a third input/output controller for controlling the input and output of information from and to the first information processing device wherein the third input/output controller controls the output of the first set of information to the first information processing device. The third information processing device includes a fourth input/output controller for controlling the input and output of information from and to the first information processing device wherein the fourth input/output controller controls the input of the first information from the first set of information processing device.

The first information processing device may further include a generator for generating the second set of information using a hash function, wherein the third information processing device distinguishes the user having the second set of information processing device which has output the first set of information to the first information processing device, based on the second set of information contained in the first set of information regarding which input is controlled by the fourth input/output controller.

With the third information processing device, the fourth input/output controller may control the output of a third set of information which is a reply to the first set of information containing the second set of information.

According to a fifth aspect of the present invention, a service providing system includes: a first information processing device which exchanges information with other information processing devices via a network. A second information processing device of a user, a third information processing device of a corporation, and a fourth information processing device of a distribution firm are also provided. The first information processing device includes a first input/output controller for controlling the input and output of information to and from the second information processing device. A second input/output controller controls the input and output of information to and from the third information processing device, and a third input/output controller controls the input and output of information to and from the fourth information processing device. A substituting mechanism is provided for substituting personal information of the user contained in a first set of information relating to purchasing merchandise, the input of which is controlled by the first input/output controller with a second set of information corresponding to the personal information of the user on a one-to-one basis. A first recording controller controls the recording of the personal information of the user and the second set of information such that the personal information of the user and the second set of information are recorded in a corresponding manner. A first function is provided for searching the distribution firm which has entered into contract with a predetermined group based on the second information regarding which input is controlled by the second input/output control means. A second recording controller is provided for controlling the recording of the personal attribute information of the user. A verifier verifies permission to access personal attribute information of the user regarding which recording is controlled by the second recording controller. A second searching function is provided for searching for the personal attribute information of the user regarding which recording is controlled by the second recording controller, in the event that the verifier verifies permission of access for the fourth information processing device. The user is registered as a member of a predetermined group, and the second information is determined corresponding to the group. The second input/output controller controls the output to the third information processing device of the first information relating to purchasing merchandise wherein the personal information of the user is substituted with the second information by the substituting mechanism, the third input/output controller controls the output to the fourth information processing device of the personal attributes information of the user searched by the second searching function, the verifier verifies permission to access the personal attribute information of the user registered to the group, based on the contract between the distribution firm and the group, and the second information processing device includes a fourth input/output controller for controlling the input and output of information from and to the first information processing device, the fourth input/output controller controls output of the first set of information relating to purchasing merchandise to the first information processing device, the third information processing device comprises a fifth input/output controller for controlling input and output of information from and to the first information processing device wherein the fifth input/output controller controls input of the first set of information relating to purchase of the merchandise, from the first information processing device, and also controls output to the first information processing device of signals for causing the first searching function to search for the distribution firm which has entered into a contract with the group with which the user desiring to purchase the merchandise is registered, based on the second set of information contained in the first set of information relating to purchasing of the merchandise and the fourth information processing device includes a sixth input/output controller for controlling the input and output of information from and to the first information processing device, wherein the sixth input/output controller controls the output to the first information processing device of signals for causing the second searching function to search for personal information of the user desiring to purchase the merchandise, and also controls input of the personal information of the user searched by the second searching function, from the first information processing device.

According to a sixth aspect of the present invention, an information processing device which exchanges information with other information processing devices via a network includes: a first recording controller for controlling the recording of information relating to a community formed from a number of users. Communication services are provided to the users making up the community. A first input controller is provided for controlling the input of proposals to a corporation from a first other information processing device of an owner of the community. A second recording controller is provided for controlling the recording of information relating to the proposal to the corporation regarding which input is controlled by the first input controller; a first output controller is provided for controlling the output to the second other information processing device of the corporation of the proposal to the corporation regarding which recording is controlled by the second recording controller. A second input controller is provided for controlling the input of signals from the second other information processing device, indicating that the proposal to the corporation is accepted. A second output control is provided for controlling output of signals indicating that the proposal to the corporation is accepted to the first other information processing device, wherein, in the event that input signals indicating that the proposal to the corporation is accepted is controlled by the second input controller, the second recording controller further controls recording of the name of the corporation which has accepted the proposal to the corporation.

A number of second other information processing devices of a number of corporations may be connected to the network, and the proposal to the corporation may contain information regarding the corporation which is the object of a proposal to the corporation, of the number of corporations.

The information processing device may further include a billing processor for executing billing processing to the corporation, based on the number of times that output of the proposal to the corporation to the second other information processing device of the corporation has been controlled by the first output controller.

The information processing device may further include a billing processor for executing billing processing to the corporation in the event that the proposal to the corporation is established. The billing processor may execute billing processing to the corporation based on the number of times that the proposal to the corporation is established, or may execute billing processing to the corporation based on the amount of revenue of the corporation is due to the proposal being established.

According to a seventh aspect of the present invention, an information processing method for an information processing device which exchanges information with other information processing devices via a network includes: a first recording control step for controlling recording of information relating to a community comprising a number of users; a communication service providing step for providing communication services to the users making up the community; a first input control step for controlling the input of proposals to a corporation from a first other information processing device of an owner of the community; a second recording control step for controlling the recording of information relating to the proposal to the corporation regarding which input is controlled by the processing in the first input control step; a first output control step for controlling the output to the second other information processing device which the corporation has of the proposal to the corporation regarding which recording is controlled by the processing in the second recording control step; a second input control step for controlling the input of signals from the second other information processing device, indicating that the proposal to the corporation is accepted; and a second output control step for controlling the output of signals indicating that the proposal to the corporation are accepted to the first other information processing device; wherein, in the event that input signals indicating the proposal is accepted is controlled by the processing in the second input control step, recording of the name of the corporation which has accepted the proposal to the corporation is further controlled by the processing in the second recording control step.

According to an eighth aspect of the present invention, a program for an information processing device which exchanges information with other information processing devices via a network includes code for: a first recording control step for controlling recording of information relating to a community comprising a number of users; a communication service providing step for providing communication services to the users making up the community; a first input control step for controlling the input of proposals to a corporation from a first other information processing device of an owner of the community; a second recording control step for controlling the recording of information relating to the proposal to the corporation regarding which input is controlled by the processing in the first input control step; a first output control step for controlling the output to the second other information processing device of the corporation of the proposal to the corporation regarding which recording is controlled by the processing in the second recording control step; a second input control step for controlling the input of signals from the second other information processing device, indicating that the proposal to the corporation is accepted; and a second output control step for controlling the output of signals indicating that the proposal to the corporation is accepted to the first other information processing device; wherein, in the event that input signals indicating that the proposal to the corporation are accepted is controlled by the processing in the second input control step, recording of the name of the corporation which has accepted the proposal is further controlled by the processing in the second recording control step.

According to a ninth aspect of the present invention, an information processing device which exchanges information with other information processing devices via a network includes: a first recording controller for controlling the recording of information relating to a community comprising predetermined users; a first input controller for controlling the input of proposals to the community from a first other information processing device of a corporation; a second recording controller for controlling recording of information relating to proposals to the community regarding which input is controlled by the first input controller; a first output controller for controlling the output to the second other information processing device of the owner of the community, of proposals to the community regarding which recording has been controlled by the second recording controller; a second input controller for controlling the input of signals indicating acceptance of the proposal to the community from the second other information processing device; and a second output controller for controlling the output to the first other information processing device, of signals indicating that the proposal to the community is accepted; wherein, in the event that the input of signals indicating that the proposal to the community is accepted is controlled by the second input controller, the second recording controller further controls recording to the name of the community which has accepted the proposal to the community.

The information processing device may further include a third output controller for controlling the output of information to a plurality of third other information processing devices of the members of the community, wherein the proposal to the community is the distribution of advertisements to members of the community, and the third output controller controls the output of the advertisements to the third other information processing devices.

The information processing device may further comprise a billing processor wherein billing processing to the corporation is executed based on the number of advertisements distributed regarding which output is controlled by the third output controller, or wherein billing processing to the corporation is executed based on the number of times proposals to the community are established, or wherein billing processing to the corporation is executed based on the amount of revenue of the corporation is due to the proposal to the community being established.

According to another aspect of the present invention, an information processing method for an information processing device which exchanges information with other information processing devices via a network includes: a first recording control step for controlling the recording of information relating to a community comprising predetermined users; a first input control step for controlling the input of proposals to the community from a first other information processing device a corporation; a second recording control step for controlling the recording of information relating to proposals to the community regarding which input is controlled by the processing in the first input control step; a first output control step for controlling the output to the second other information processing device the owner of the community, of proposals to the community regarding which recording has been controlled by the processing in the second recording control step; a second input control step for controlling the input of signals indicating the acceptance of the proposal to the community from the second other information processing device; and a second output control step for controlling the output to the first other information processing device, of signals indicating that the proposal to the community is accepted; wherein, in the event that the input of signals indicating that the proposal to the community is accepted is controlled by the processing of the second input control step, recording of the name of the community which has accepted the proposal is further controlled by the processing in the second recording control step.

According to another aspect of the present invention, a program for an information processing device which exchanges information with other information processing devices via a network includes code for: a first recording control step for controlling the recording of information relating to a community comprising predetermined users; a first input control step for controlling the input of proposals to the community from a first other information processing device of a corporation; a second recording control step for controlling the recording of information relating to proposals to the community regarding which input is controlled by the processing in the first input control step; a first output control step for controlling the output to the second other information processing device of the owner of the community, of proposals to the community regarding which recording has been controlled by the processing in the second recording control step; a second input control step for controlling the input of signals indicating the acceptance of the proposal to the community from the second other information processing device; and a second output control step for controlling the output to the first other information processing device, of signals indicating that the proposal to the community is accepted; wherein, in the event that input of signals indicating that the proposal to the community is accepted is controlled by the processing of the second input control step, recording of the name of the community which has accepted the proposal is further controlled by the processing in the second recording control step.

According to yet another aspect of the present invention, a service providing system includes: a first information processing device which executes processing relating to the activity of a community formed of a number of users; second information processing devices of the users; third information processing devices of corporations; and a fourth information processing device of a third-party organization for monitoring the activity of the community; the first information processing device includes a first recording controller for controlling the recording of information relating to the community made up of the number of users, communication service is provided for providing communication services to the number of users making up the community, and a first input/output controller for controlling the input and output of information to and from the second through fourth information processing devices; the second information processing device includes a second input/output controller for controlling the input and output of information to and from the first information processing device; the third information processing device includes a third input/output controller for controlling the input and output of information to and from the first information processing device, wherein the third input/output controller controls the output of sending request for reliability information of the community to the fourth information processing device via the first information processing device; and the fourth information processing device includes a fourth input/output controller for controlling the input and output of information to and from the first information processing device, and generator for generating the community reliability information based on information relating to the community regarding which recording is controlled by the first recording controller, regarding which input is controlled by the fourth input/output controller; wherein the fourth input/output control means controls the input of requests sent for the community reliability information, and control the output of the community reliability information to the third information processing device via the first information processing device.

BRIEF DESCRIPTION OF THE FIGURES

FIG. 11 is a flowchart describing the processing executed in the event of a corporation participating in the service commissioning a proposal such as running an advertisement or the like.

DETAILED DESCRIPTION OF THE INVENTION

Embodiments of the present invention will now be described with reference to the drawings.

Figure 1:
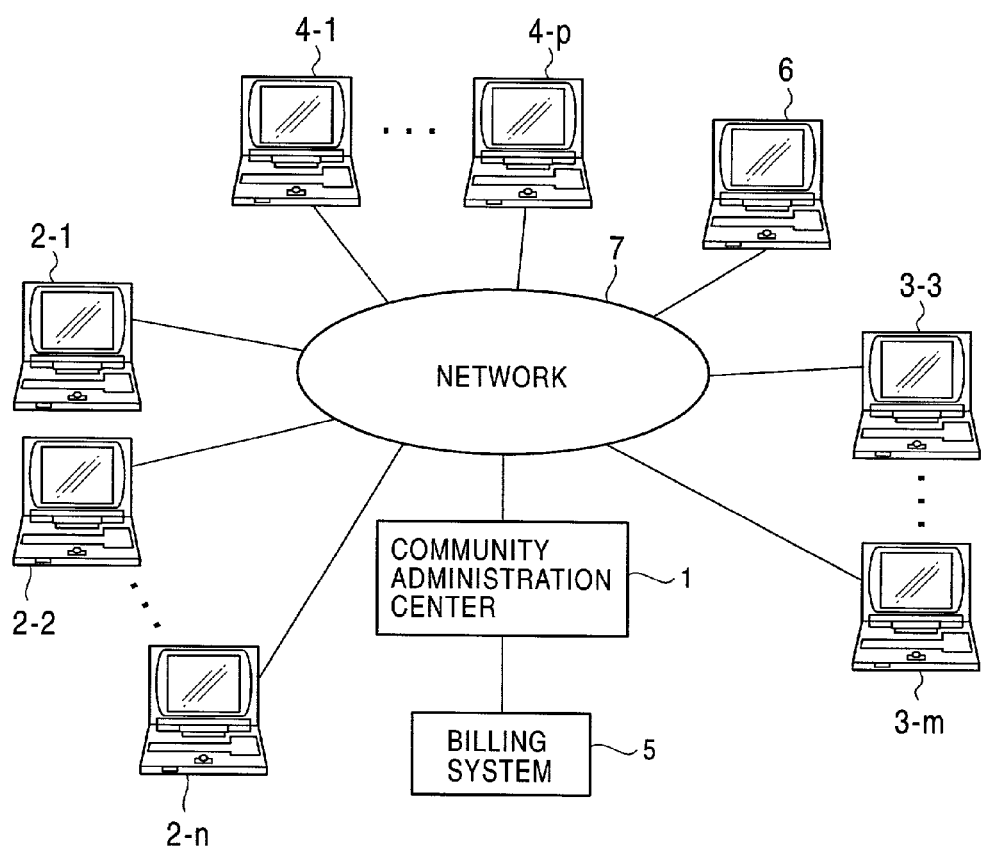
FIG. 1 is a diagram describing the network configuration of a service for providing a community system.

FIG. 1 illustrates a network configuration of a service for providing a community system to which the present invention is applied (hereafter referred to as "present service").

Figure 5:
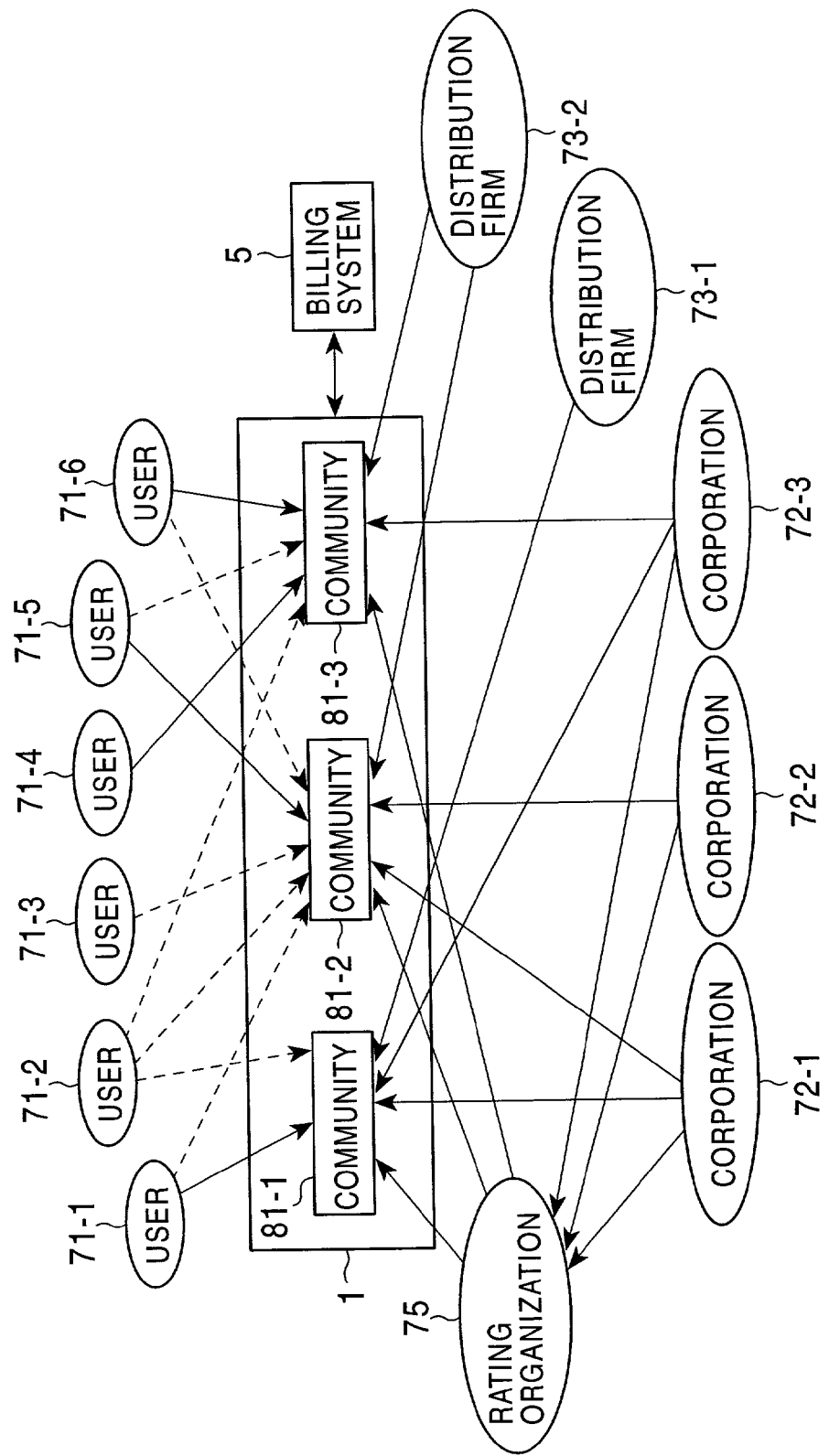
FIG. 5 is a diagram describing a community.

User terminal devices 2-1 through 2-n which either the users have or are accessible to the users, corporation terminal devices 3-1 through 3-m which corporations participating in the present service have, distribution firm terminal devices 4-1 through 4-p which distribution corporations registered with the present service have, and a rating organization terminal device 6 which a rating organization serving as a third party organization for rating the reliability of the community described later with reference to FIG. 5 has, are connected to a community administration center 1 via a network 7 such as the Internet or the like. The community administration center 1 is also connected to a billing system 5.

Figure 6:
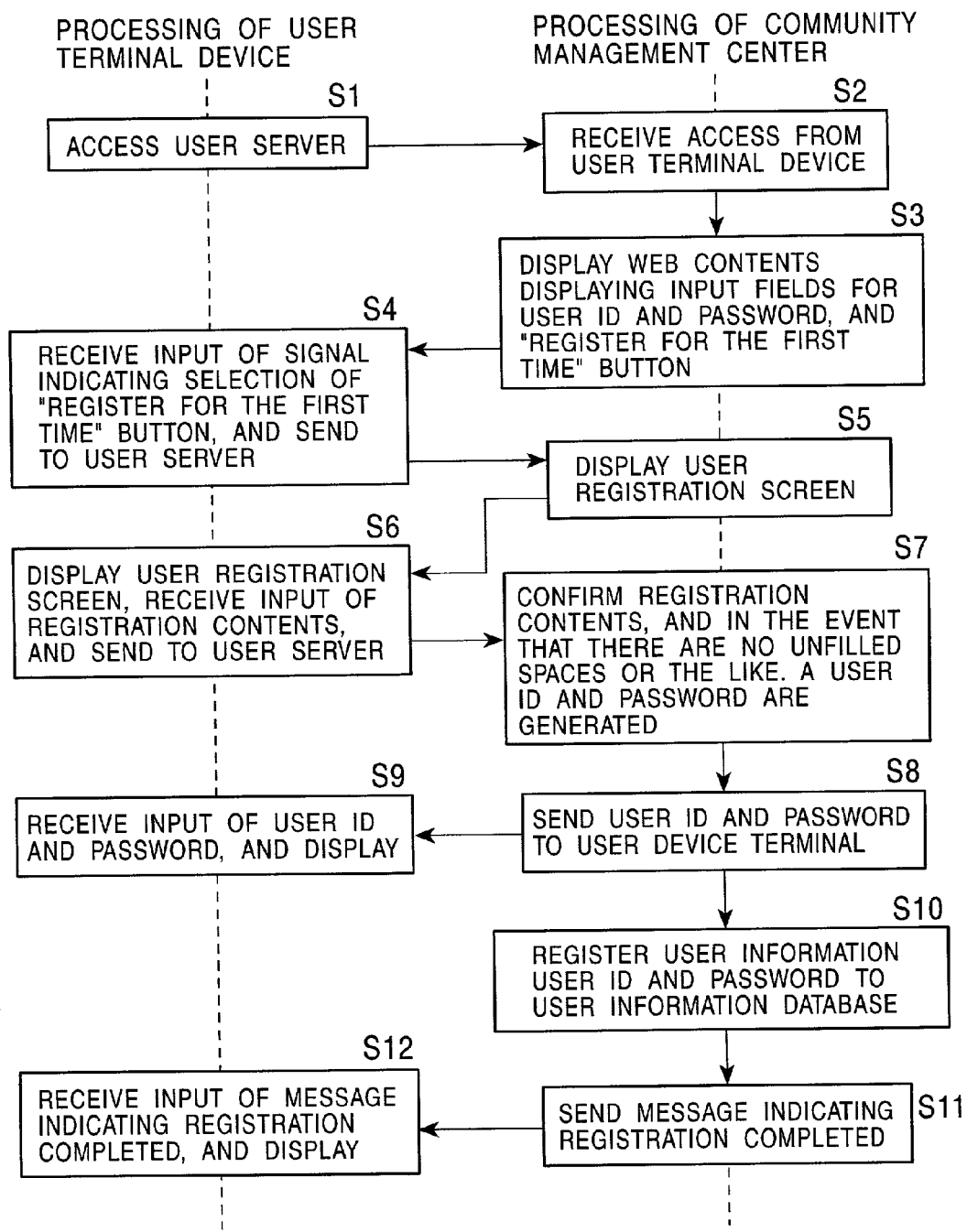
FIG. 6 is a flowchart describing the processing executed in the event of a user participating in the service for providing the community system.

Users access the community administration center 1 using the user terminal devices 2-1 through 2-n, and are registered with the present service by executing the registration processed described later with reference to FIG. 6. Users registered with the present service can participate in the community described later with reference to FIG. 5, and receive services provided by corporations registered with the present service.

Corporations registered with the present service provided various types of services to users registered with the present service, via the community, by accessing the community administration center 1 using the corporation terminal devices 3-1 through 3-m.

In the event that users registered with the present service purchase merchandise from corporations registered with the present service, distribution firms registered with the present service receive merchandise sending commissions from the corporations via the community administration center 1, using the distribution firm terminal devices 4-1 through 4-p, and distribute the merchandise from the corporations to the users.

The present service allows the community and corporations to smoothly enter into various types of contracts without personal user information being disclosed, by a third-party organization rating the reliability of the community described later with reference to FIG. 5. The rating organization uses the rating organization terminal device 6 to access the community administration center 1, obtain various types of information relating to the community, rate the community according to the information, and if necessary, provide the community ranking information to corporations.

The community administration center 1 sends information relating to billing with regard to use of the present service to the billing system 5. Here, the billing system 5 will be described as not being connected to the network 7, but rather connected only to the community administration center 1, but an arrangement may be made as well wherein the billing system 5 is connected to the community administration system 1 via the network 7.

The billing system 5 is for managing payment of charges mutually occurring between the users, corporations, and distribution firms, registered with the present service, as well as the provider of the present service. The billing system 5 is managed and operated by, for example, banks, credit companies, vendors or couriers who deliver merchandise COD, corporations which perform various types of billing processing on the Internet (e.g., prepaid services, credit card number pre-registration services, e-credit, etc.) convenience stores which perform various types of billing processing on the Internet, and so forth, either independently or cooperatively. While only one billing system 5 is shown here, an arrangement may be made wherein multiple billing systems are provided and users can select a billing system 5 to use from these.

Figure 2:
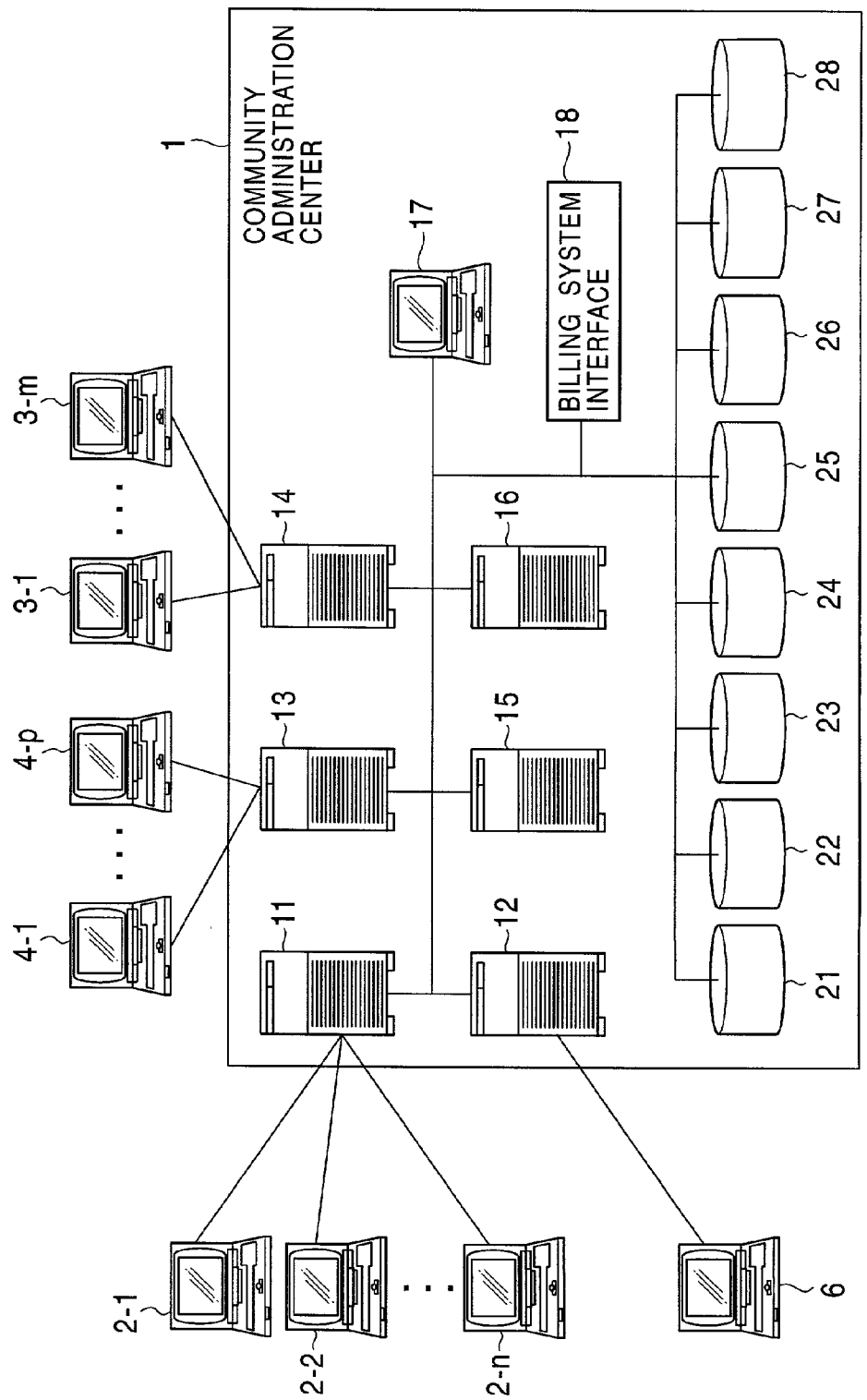
FIG. 2 is a diagram describing the configuration of a community administration system.

FIG. 2 is a diagram illustrating the configuration of the connection between the community administration center 1, the user terminal devices 2-1 through 2-n, the corporation terminal devices 3-1 through 3-m, the distribution firm terminal devices 4-1 through 4-p, and the rating organization terminal device 6. Note that in FIG. 2, the network 7 mutually connecting the user terminal devices 2-1 through 2-n, corporation terminal devices 3-1 through 3-m, distribution firm terminal devices 4-1 through 4-p, and rating organization terminal device 6, with the community administration center 1, is omitted from the diagram.

The community administration center 1 has a user server 11, a rating organization server 12, a distribution firm server 13, a corporation server 14, a verification server 15, a controller 16, a system administration terminal device 17, a billing system interface 18, a user information database 21, a community information database 22, a payment information database 23, a corporation information database 24, a complaints database 25, a complaints processing database 26, a corporation proposal database 27, and a community proposal database 28, mutually connected. Incidentally, though the description here is made with reference to an arrangement wherein the community administration center 1 is configured of multiple devices, an arrangement may be made as well wherein one device carries out all the functions of the community administration center 1.

The user server 11 is connected to the user terminal devices 2-1 through 2-n via the network 7, and generates various types of Web contents which the users can view using the user terminal devices 2-1 through 2-n, and discloses the contents on the network 7. Then, the user server 11 follows signals input from the user terminal devices 2-1 through 2-n via the network 7 to execute processing for registering new users, registration of new communities, and processing relating to services received by participants in the community.

The rating organization server 12 is connected to the rating organization terminal device 6 via the network 7, so as to exchange information. For example, the rating organization server 12 sends signals input from the rating organization terminal device 6 to the controller 16, whereby information necessary for rating the community is searched from the community information database 22, payment information database 23, complaints database 25, etc., according to the access range which the community permits, and the searched results are sent to the rating organization terminal device 6 via the rating organization server 12 and the network 7.

The distribution firm server 13 is connected to the distribution firm terminal devices 4-1 through 4-p via the network 7, so as to exchange information. The corporation server 14 is connected to the corporation terminal devices 3-1 through 3-m, so as to exchange information via the network 7.

The verification server 15 executes verification processing in the event that the user terminal devices 2-1 through 2-n access the user server 11, in the event that the distribution firm terminal devices 4-1 through 4-p access the distribution firm server 13, in the event that the corporation terminal devices 3-1 through 3-m access the corporation server 14, or in the event that the rating organization terminal device 6 accesses the rating organization server 12. In the event that any of the device terminals of the user terminal device 2-1 through the rating organization terminal device 6 attempts to access the corresponding server of the user server 11 or the rating organization server 12, an ID (Identity) and password for example are input to the user server 11 and the rating organization server 12 via the network 7. The verification server 15 receives the input of the ID and password from the user server 11 and the rating organization server 12, judges whether or not the access request is from a proper user terminal device 2-1 through 2-n, corporation terminal device 3-1 through 3-m, distribution firm terminal device 4-1 through 4-p, or rating organization terminal device 6, by searching for the input ID and password in the user information database 21 or corporation information database 24 for example, and outputs the results thereof to the corresponding server, of the user server 11 through the corporation server 14.

The controller 16 controls access permission of the user server 11 through the verification server 15 to access the user information database 21 through the complaints processing database 26, records billing processing relating to the present service and data necessary for the billing processing, and sends the information relating to billing to the billing system 5 via the billing system interface 18.

Information relating to users registered with the present service is registered in the user information database 21. At the time of a user registering to the present service, user attributes regarding each user, such as user ID, name, age, address, e-mail address, interests, personal keywords (such as hobbies or the like), and so forth, are registered in the user information database 21. In the event that the user subsequently participates in a community, the community in which the user is participating is registered in the user information database 21, and in the even that the user cancels participation in the community, the registered community is deleted.

Information relating to communities is registered in the community information database 22. Registered in the community information database 22 are, for example, the community name, object of interest of the community, number of members, average age of members, age distribution of members, gender ratio of members, list of members, name of owner managing the community, ranking of personal keywords of members (i.e., a predetermined number of top-ranked personal keywords shared by the members), keyword (or keywords) representing the community, distribution firm name or distribution firm ID with which the community has a contract, and so forth. For example, the later-described processing, in the event that a corporation obtains information from users via a community, the corporation cannot know personal information of the user, but can grasp an image of the users which are the source of information by, for example, the personal keyword rankings of the members in the corresponding community. In the event that there is a change in the members making up the community, the corresponding information in the community information database 22 is also changed accordingly.

Also, in the event that questions or requests are sent from a user to a corporation via the community or merchandise is ordered, by the processing described later with reference to FIGS. 7 and 8, the community information database 22 records the user ID of the corresponding user and a serial No. sent to the corporation instead of the user ID, in a corresponding manner.

The payment information database 23 registers information relating to payment performance of usage charges occurring due to using the present service. Registered in the payment information database 23 are, for example, the ID of the user or corporation making a payment, contents of the payment, date and time of the payment, and payment method. The corporation information database 24 registers information relating to corporations and distribution firms registered with the present service. Registered in the corporation information database 24 are, for example, names of corporations or distribution firms, ID of the corporations or distribution firms, addresses, e-mail address, service contents, and so forth.

The complaints database 25 registers information relating to complaints from users, corporations, and distribution firms, registered with the present service. Registered in the complaints database 25 are Nos. appended to the corresponding complaints, the ID of the user, corporation, or distribution firm filing the complaint, contents of the complaint, date and time of registration, and so forth. The complaints processing database 26 registers information relating to how the system administrator handled the complaints using the later-described system administration terminal device 17. Registered in the complaints processing database 26 are the No. of the corresponding complaint, the method of handling the complaint, the results thereof, the date and time in which the complaint was handled, and so forth.

The corporation proposal database 27 registers, by the processing described later with reference to FIG. 11, for example the contents of proposals made to the community by corporations, such as running advertisements or planning events, and in the event that the community decides to accept the proposal of the corporation and notifies the corporation of this, the corporation proposal database 27 records the fact that the proposal has been established. Registered in the corporation proposal database 27 are, for example, the name of the corporation making the proposal, the contents of the proposal, the communities which are the object of the proposal, the name of communities which have accepted the proposal, and so forth, in such a manner that the community can view the registered contents. The communities which are the object of the proposal can be registered by, for example, specific community names, community attributes, and so forth, so that registration can be made without specifying communities, as well.

Figure 10:
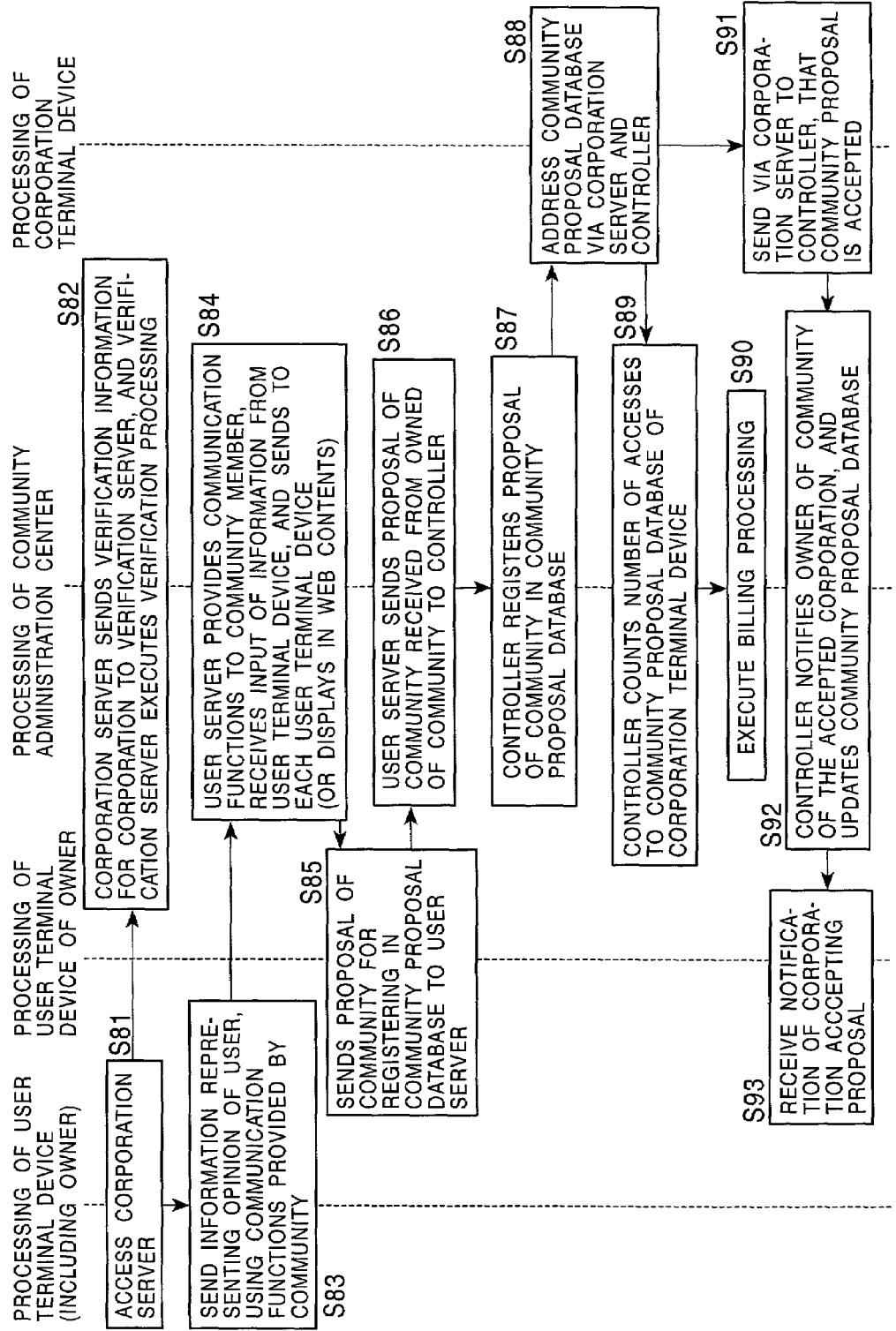
FIG. 10 is a flowchart describing the processing executed in the event of a user participating in the service making a proposal to a corporation.

The community proposal database 28 registers the contents of proposals made from the community to corporations by the processing described later with reference to FIG. 10, decided upon the members of the community, such as group purchasing of merchandise by the members of the community, merchandise which the community desires to purchase or plans for services which the community desires to receive, and so forth, and in the event that a corporation decides to accept a proposal of the community and notifies the community of this, the community proposal database 28 makes record of the fact that the proposal has been established. Registered in the community proposal database 28 are, for example, the name of the community making the proposal, the contents of the proposal, corporations which are the object of the proposal, the names of corporations accepting the proposal, and so forth, and the corporations can view the registered contents. Corporations which are the object of proposals can be registered by, for example, specific corporation names, the field of merchandise or services which the corporation provides, and so forth, so that registration can be made without specifying corporations, as well.

The system administration terminal device 17 is a terminal device for system administration and complaints processing for the system according to the present service. The system administration terminal device 17 accesses the complaints database 25 via the controller 16, searches for data regarding complaints filed by participants in the present service, and in the event that measures are taken to deal with a complaint either by processing of the system administration terminal device 17 or by processing which the administrator carries out, the measures, results thereof, and so forth are sent to the complaints processing database 26 via the controller 16, and saved there. The billing system interface 18 is connected to the billing system 5 shown in FIG. 1, and exchanges data with the controller 16.

In the following description, in the event that there is no need to differentiate between the user terminal devices 2-1 through 2-n, these will be collectively referred to as "user terminal device 2", in the event that there is no need to differentiate between the corporation terminal devices 3-1 through 3-m, these will be collectively referred to as "corporation terminal device 3", and in the event that there is no need to differentiate between the distribution firm terminal devices 4-1 through 4-p, these will be collectively referred to as "distribution firm terminal device 4".

Figure 3:
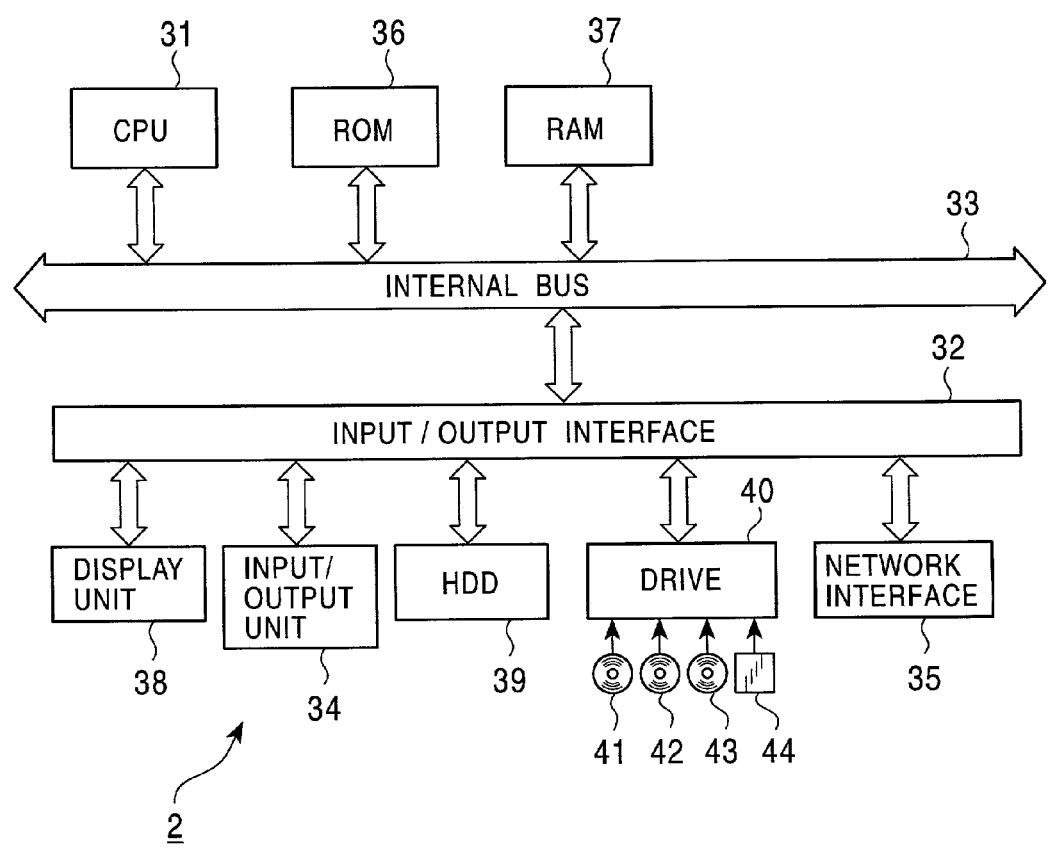
FIG. 3 is a block diagram describing the configuration of a user terminal device.

FIG. 3 is a block diagram illustrating the configuration of the user terminal device 2. Note that the corporation terminal device 3, distribution firm terminal device 4, rating organization terminal device 6, and system administration terminal device 17 all basically have the same configuration as that of the user terminal device 2. Accordingly, description of these terminal device will be omitted.

A CPU (Central Processing Unit) 31 receives, for example, signals corresponding to various commands input by the user or by an operator, from an input unit 34 or signals input through a network interface 35, via an input/output interface 32 and internal bus 33, and executes various types of processing based on the signals. ROM (Read-Only Memory) 36 stores, of the programs to be used by the CPU 31 (e.g., a Web browser for viewing Web contents disclosed on the network 7) and parameters for computation, data that is basically fixed. RAM (Random Access Memory) 37 stores programs used in executing by the CPU 31, and parameters which change in the executing thereof. The CPU 31, ROM 36, and RAM 37 are mutually connected by the internal bus 33.

The internal bus 33 is also connected to the input/output interface 32. The input unit 34 is made up of a keyboard or mouse or the like, and is operated for inputting various types of commands to the CPU 31. A display unit 38 is formed of a CRT (Cathode Ray Tube) or the like for example, for displaying various types of information in text or images. A HDD (Hard Disk Drive) 39 drives a hard disk, to record or reproduce programs used by the CPU 31, and data generated by the processing of such programs. A magnetic disk 41, optical disk 42, magneto-optical disk 43, or semiconductor memory 44 are mounted to a drive 40 as necessary, to exchange data. A network interface 35 is connected to the network 7, for exchanging information with the user server 11 and so forth.

Figure 4:
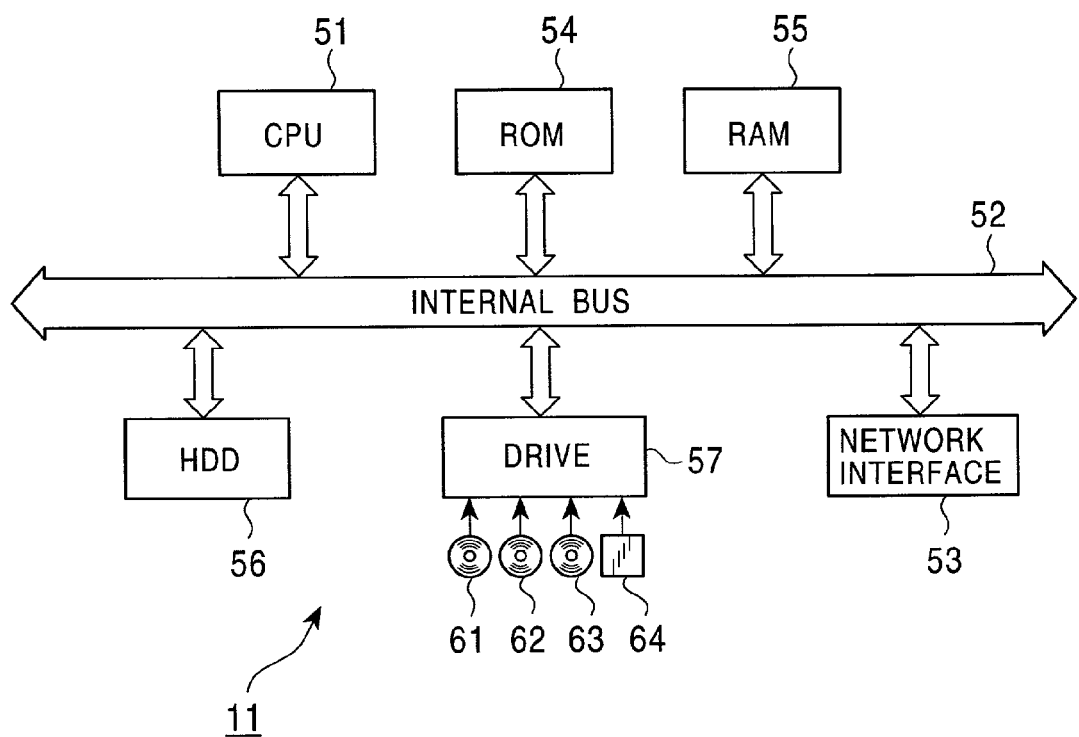
FIG. 4 is a block diagram describing the configuration of a user server.

FIG. 4 is a block diagram illustrating the configuration of the user server 11. Note that the rating organization server 12 through the controller 16 are basically of the same configuration as that of the user server 11, and accordingly description thereof will be omitted.

A CPU 51 receives signals input from the user terminal device 2 via the network 7, network interface 53, and internal bus 52, and executes various types of processing based on the signals. ROM 54 stores, of the programs to be used by the CPU 51 (e.g., programs for executing processing for providing services such as later-described new user registration processing, community searching processing based on input keywords, mailing lists and electronic bulletins (BBS, or Bulletin Board System), and so forth) provided to the community members, and parameters for computation, data that is basically fixed. RAM 55 stores programs used in executing by the CPU 51, and parameters which change in the executing thereof. The CPU 51, ROM 54, and RAM 55 are mutually connected by the internal bus 52.

The internal bus 52 is also connected to a HDD 56, drive 57, and network interface 53. The HDD 56 drives a hard disk, to record or reproduce programs used by the CPU 51, and data generated by the processing of such programs. A magnetic disk 61, optical disk 62, magneto-optical disk 63, or semiconductor memory 64 are mounted to the drive 57 as necessary, to exchange data. The network interface 53 is connected to the network 7, for exchanging information with the user terminal device 2, or exchanging information with the distribution firm server 13, corporation server 14, controller 16 user information database 21, and community information database 22, via predetermined interface cables or the like.

Next, the relation between the community service which the present service provides, and the users, corporations, distribution firms, and rating organization, will be described with reference to FIG. 5.

Users 71-1 through 71-6 use user terminal devices 2 according to processing described later with reference to FIG. 6 to access the user server 11 of the community administration center 1 via the network 7, and be registered with the present service by registering required information such as, for example, name, age, sex, interests, keywords such as hobbies indicating the individual, address, e-mail address, and so forth, which are to serve as personal attributes of the user. The users 71-1 through 71-6 which have registered with the present service may participate in an already-existing community (communities 81-1 through 81-3 in FIG. 5), or may create a new community of their own.

Communities are groups of users with common interests or common objects, and various sorts of communities can be imagined, such as, for example, groups of wine lovers, groups for class reunions, groups for people who like to go sightseeing to exchange information, groups of people attempting to pass a test for a particular type of certification, groups for buffs of a particular game, and so forth. A community is operated around one or multiple owners.

For example, in FIG. 5, the user 71-1 is the owner of the community 81-1, and a participant in the community 81-2.

In the same way, the user 71-2 is a participant in the three communities 81-1 through 81-3, and the user 71-3 is a participant in the community 81-2. The user 71-4 is an owner of the community 81-3, the user 71-5 is the owner of the community 81-2 and a participant in the community 81-3, and the user 71-6 is an owner of the community 81-3 and a participant in the community 81-2. In this way, users can participate in as many communities as they desire. Also, here, the communities 81-1 and 81-2 are operated by one owner, while the community 81-3 is operated by two owners.

Each of the communities 81-1 through 81-3 have attributes such as the name of the community, the interests of the community, the number of members, the average age of the members, the age distribution of the members, the gender ratio of the members, a list of members, the name of the owner(s), a ranking of personal keywords of the members, keywords representing the community, and so forth, so that users registered with the present service can find and participate in communities matching their own interests or objects, by searching through community keywords or rankings of personal keywords of members, for example.

Corporations 72-1 through 72-3 provide services to the users 71-1 through 71-6, via the communities 81-1 through 81-3. The corporations 72-1 through 72-3 can only provide services to communities to which they have access permission. For example, in FIG. 5, the corporation 72-1 has permission to access the communities 81-1 and 81-2, the corporation 72-2 has permission to access the community 81-2, and the corporation 72-1 has permission to access the communities 812 and 81-3, so as to provide services thereto. The corporations 72-1 through 72-3 can view the portion of attributes information of the community regarding which the owners of the communities 81-1 through 81-3 have given permission, but cannot know personal information of the users 71-1 through 71-6 participating in the communities 81-1 through 81-3.

The distribution firms 73-1 and 73-2 enter into contract with one or more of the communities 81-1 through 81-3, and thus gain access permission to obtain personal information such as the addresses, telephone numbers, names, etc., of the users 71-1 through 71-6 participating in the corresponding community. Then, in the event that the users 71-1 through 71-6 purchase merchandise from any of the corporations 72-1 through 71-3 via any of the communities 81-1 through 81-3, the distribution firms 73-1 and 73-2 distribute the purchased merchandise based on the personal information obtained by entering into contract therewith. For example, in the case shown in FIG. 5, the distribution firm 73-1 has entered into contract with the community 81-1, and accordingly has permission to access personal information for the users 71-1 and 71-2, and the distribution firm 73-2 has entered into contract with the communities 81-2 and 81-3, and accordingly has permission to access personal information for the users 71-1 through 71-6. The distribution firms 73-1 and 73-2 receive shipping commissions for merchandise or the like not by user ID by a serial No. described later with reference to FIG. 8, and accordingly there is no exchange of personal information of the users 71-1 through 71-6 between the corporations 72-1 through 72-3 and the distribution firms 73-1 and 73-2.

Subsequently, in the event that there is no need to differentiate between the users 71-1 through 71-6, these will be collectively referred to as "user 71", in the event that there is no need to differentiate between the corporations 72-1 through 72-3, these will be collectively referred to as "corporation 72", in the event that there is no need to differentiate between the distribution firms 73-1 and 73-2, these will be collectively referred to as "distribution firm 73", and in the event that there is no need to differentiate between the communities 81-1 through 81-3, these will be collectively referred to as "community 81".

The rating organization 75 which is an external organization rates the reliability of the community 81 by accessing the community information database 22, payment information database 23, complaints database 25, and so forth, via the rating organization server 12 described with reference to FIG. 2, rates the reliability of the community 81 based on, for example, whether or not there are members who are late making payments, members against whom complaints have been filed, and so forth, and if necessary provides information relating to the reliability of the community 81 to the corporation 72. Now, the information which the rating organization 75 provides to the corporation 72 is only information relating to the community 81 and does not contain personal information of the user 71 within the community 81, but an arrangement can be conceived wherein, for example, the rating organization 75 obtains permission from the owner of the community 81, either by the rating organization 75 asking for such permission from the owner or the owner desiring such, and searches and confirms personal information for the user 71 of the corresponding community 81 from the user information database 21, thereby further increasing the reliability of the community 81.

Next, description will be made regarding an example of services provided to the user 71 from the community 81.

Users 71 which are members of communities 81 can received BBS and mailing list services operated by the community 81. Now, a BBS is not a one-on-one communication means like e-mail, but rather is a system wherein information can be transmitted from one to many, and is called an electronic bulletin (BBS, or Bulletin Board System) since the configuration resembles that of a bulletin board. In the event that one of the members of the community 81 posts a message on this BBS, all of the other members can view this message, and members who have read this message can further post replies on the bulletin (which will also be disclosed to all other members) or personally reply using e-mail.

Also, a mailing list realizes services which are the same as those of a host-intensive BBS, through personal computer communications on a scattered network environment, by transferring e-mail sent to a predetermined mail address to all participants.

Also, for example, an arrangement may be made wherein a so-called chat service is provided for example, wherein, in a state that multiple users 71 are simultaneously accessed to Web contents to which only members of a particular community can access, a statement of a user 71, i.e., a message written by the user 71 with the input unit 34 to the Web contents is sent to the user server 11 via the network 7, and all such statements are input to all user terminal devices 2 accessed to the corresponding Web contents via the network 7, thereby displaying the statements on the display units 38 of each, so that participants can enjoy a pseudo-conversation in real-time.

Note that the owner of the community 81 is given, for example, the authority to permit participation of new members, functions for counting votes by members, functions for presenting schedules, the authority to strip members of their membership, the authority to forcibly delete information posted on a BBS, the authority to determine the extent of permission for corporations 72 and the rating organization 75 to access community information, and so forth, in order to ensure that the community 81 is operated smoothly.

Also, users 71 participating in the community 81 exchange information with corporations 72 via the community 81, thereby enabling, for example, a user 71 to transmit questions to a corporation 72 and receive replies from the corporation 72, or purchase merchandise provided by the corporation 72, without allowing the corporation 72 to know personal information of the user 71 such as e-mail address, name, and so forth. The corporation 72 cannot know the personal information of the user 71 who sending the question or purchasing the merchandise, but can gather general information relating to the user 71 from the attributes of the community 81 (e.g., age group, gender ratio, etc.). Also, in the event that the corporation 72 collects questionnaires from the community 81 or applies for advertising in the community 81, by later-described processing, the corporation 72 can know the attributes of the community 81, and accordingly can target market segments for the questionnaires and advertisements.

Next, the registration processing for a user 71 necessary to participate in a community 81 in the present service will be described with reference to the flowchart shown in FIG. 6.

In step S1, the CPU 31 of the user terminal device 2 accesses the user server 11, via the internal bus 33, input/output interface 32, network interface 35, and network 7.

In step S2, the CPU 51 of the user server 11 is accessed by the user terminal device 2, and in step S3 sends to the user terminal device 2 Web contents displaying input fields for user ID and password, along with a "register for the first time" button, via the internal bus 52, network interface 53, and network 7, so that the Web contents are displayed on the display unit 38 of the user terminal device 2.

In step S4, the CPU 31 of the user terminal device 2 receives the input of the signals indicating selection of the "register for the first time" button displayed in step S3 from the input unit 34 via the input/output interface 32 and internal bus 33, and sends this to the user server 11 via the internal bus 33, input/output interface 32, network interface 35, and network 7.

In step S5, the CPU 51 of the user server 11 sends to the user terminal device 2 Web contents displaying a user registration screen, via the internal bus 52, network interface 53, and network 7, so that the user registration screen is displayed on the display unit 38 of the user terminal device 2.

In step S6, the CPU 31 of the user terminal device 2 displays the user registration screen on the display unit 38, receives input of signals indicating the contents of registration which the user 71 has input using the input unit 34 via the input/output interface 32 and internal bus 33, and sends this to the user server 11 via the internal bus 33, input/output interface 32, network interface 35, and network 7.

In step S7, the CPU 51 of the user server 11 checks the contents of registration sent from the user terminal device 2, and in the event that there are no spaces left unfilled, a user ID and password corresponding to the user are generated, and in step S8, the user ID and password are sent to the user terminal device 2 via the internal bus 52, network interface 53, and network 7.

In step S9, the CPU 31 of the user terminal device 2 receives the input of the user ID and password, and outputs this for display to the display unit 38 via the internal bus 33 and input/output interface 32.

In step S10, the CPU 51 of the user server 11 outputs and registers the contents of registration input in step S7 (i.e., user information), and the user ID and password generated in step S7, to the user information database 21 via the internal bus 52 and the network interface 53.

In step S11, the CPU 51 of the user server 11 sends to the user terminal device 2 a message indicating completion of registration, via the internal bus 52, network interface 53, and network 7.

In step S12, the CPU 31 of the user terminal device 2 receives the input of the message indicating completion of registration, and outputs this for display to the display unit 38 via the internal bus 33 and input/output interface 32, thereby ending the processing.

Due to the above processing, a user registered with the present service can search for a community 81 matching his/her own interests or objects by searching through the keywords of a community 81 or the ranking of personal keywords of the members for example, and can participate in that community 81 in the event that permission of the owner has been obtained.

Next, the processing executed in the event that a user 71 sends a question to a corporation 72 or requests support for merchandise, will be described with reference to the flowchart shown in FIG. 7.

In step S21, the CPU 31 of the user terminal device 2 accesses the user server 11 via the via the internal bus 33, input/output interface 32, and network 7, and logs into the community 81 (i.e., sends the user ID and password to the user server 11).

In step S22, the CPU 51 of the user server 11 sends the input verification information of the user 71 to the verification server 15 via the internal bus 52 and network interface 53, and the CPU 51 of the verification server 15 (note that FIG. 4 should be referred to regarding the configuration of not only the user server 11 but also of the rating organization server 12 through the controller 16) executes verification processing based on the input verification information.

In step S23, the CPU 31 of the user terminal device 2 sends to the user server 11 signals representing a question or request for support to the corporation 72, via the internal bus 33, input/output interface 32, network interface 35, and network 7.

In step S24, the CPU 51 of the user server 11 converts the user ID representing the user 71 which has sent the signals representing the input question or the like into a serial No. differing for each community, converts the reply-to e-mail address (i.e., the e-mail address of the user 71) into a community-dedicated e-mail address, and sends signals representing the question or the like to the corporation terminal device 3 via the corporation server 14 and the network 7.

In step S25, the CPU 51 of the controller 16 receives input of the serial No. and the user ID from the user server 11, correlates these, and registers these in the community information database 22.

The CPU 31 of the corporation terminal device 3 (note that FIG. 2 should be referred to regarding the configuration of not only the user terminal device 2 but also of the corporation terminal device 3, distribution firm terminal device 4, and rating organization terminal device 6) in step S26 receives input of signals representing questions or the like from the user 71, via the network 7, network interface 35, input/output interface 32, and internal bus 33, and in step S27 returns a reply along with the serial No. to the corporation server 14 to the address of the corresponding community 81, via the internal bus 33, input/output interface 32, network interface 35, and network 7.

In step S28, the CPU 51 of the user server 11 receives from the corporation server 14 input of the reply from the corporation terminal device 3, searches the user ID of the user 71 who sent the question or the like from the community information database 22 based on the serial No. contained in the reply, searches the e-mail address of the corresponding user 71 from the user information database 21, and in step S29 transfers the reply from the corporation 72 to the corresponding user 71, via the internal bus 52, network interface 53, and network 7.

In step S30, the CPU 31 of the user terminal device 2 receives the reply from the corporation 72 via the network 7, network interface 35, input/output interface 32, and internal bus 33, and the processing ends.

Due to such processing, the user 71 can make questions to the corporation 72 or request support for merchandise without the corporation 72 knowing the personal e-mail address of the user, and receive replies therefrom. Also, with regard to requests to the corporation 72 which do not require such replies, the same processing is used for transmitting requests from the user 71 to the corporation 72, SO the user 71 can communicate his/her own requests without the corporation 72 knowing personal information, and also though the corporation 72 does not know the personal information of the user 71, the corporation 72 can know that the user 71 making the request is a participant in the present service, so the corporation 72 can grasp an image of what the user 71 is like from the attributes of the community 81 to which the user 71 belongs.

Also, as another usage example of the present service, the rating organization 75 guarantees the reliability for each community, so the payment capabilities of the user 71 regarding the charges is proved without the personal information of the user 71 being disclosed to the corporation 72, and since the community 81 discloses personal information of members only to a trustworthy distribution firm 73 participating in the present service, even in the event that the user 71 applies for purchasing of merchandise from the corporation 72, the user 71 can purchase merchandise online and receive the purchase merchandise, without the address, name, credit card No., and other such personal information of the user 71 being known the to the corporation 72.

The processing executed in the event that a user 71 participating in a community 81 applies to the corporation 72 via the community 81 to purchase merchandise will be described with reference to the flowchart shown in FIG. 8.

Figure 7:
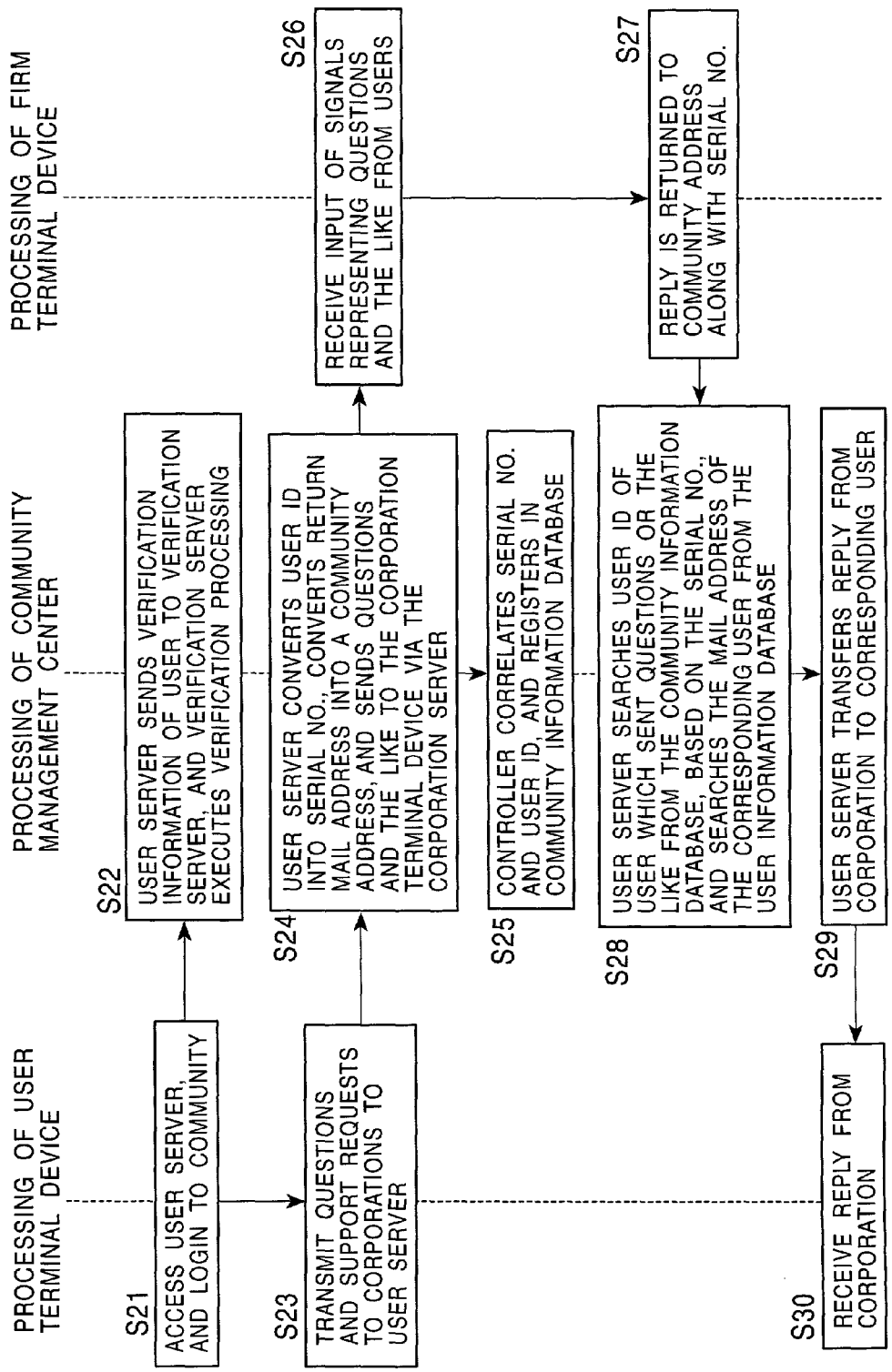
FIG. 7 is a flowchart describing the processing executed in the event of a user participating in the service sending questions or the like to a corporation.
Figure 8:
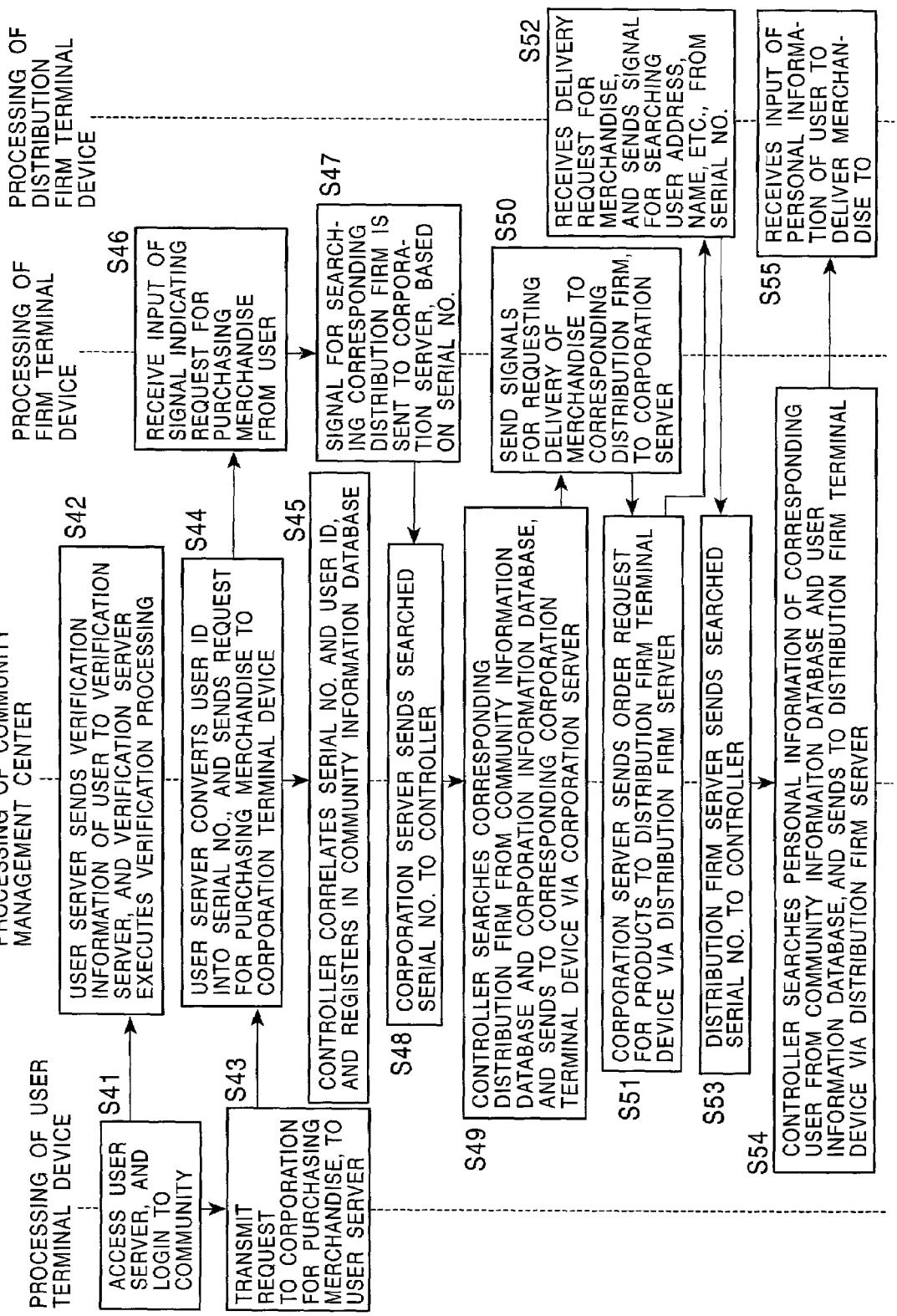
FIG. 8 is a flowchart describing the processing executed in the event of a user participating in the service applying to a corporation for purchasing merchandise.

In step S41 and step S42, processing the same as that in steps S21 and S22 in FIG. 7 is executed.

In step S43, the CPU 31 of the user terminal device 2 transmits to the user server 11 a merchandise purchasing commission to the corporation 72, via the internal bus 33, input/output interface 32, network interface 35, and network 7.

Now, the information regarding the product which the corporation 72 prices is presented to the user 71 through advertisements described later with reference to FIG. 11 which the corporation 72 commissions the community 81 to run, Web pages disclosed on the network 7 such as the Internet, and so forth. For example, an arrangement may be made wherein a button or the like for the user 71 registered with the present service to purchase merchandise using the present service in particular is provided on a Web page which the corporation 72 has disclosed, thereby allowing connection to be automatically made to the user server 11 by the user 71 registered with the present service selecting the button and inputting the user ID and password corresponding to the community 81.

In step S44, the CPU 51 of the user server 11 converts the user ID into a serial No., and sends the merchandise purchasing request to the corporation terminal device 3 via the internal bus 52, network interface 53, corporation server 14, and the network 7.

In step S45, the CPU 51 of the controller 16 receives input of the serial No. and the user ID from the user server 11, correlates these, and registers these in the community information database 22.

The CPU 31 of the corporation terminal device 3 in step S46 receives input of signals representing the merchandise purchasing request from the user 71, via the network 7, network interface 35, input/output interface 32, and internal bus 33, and in step S47 sends signals for searching distribution firms 73 with which the corresponding community 81 has entered into contract, to the corporation server 14, via the internal bus 33, input/output interface 32, network interface 35, and network 7, based on the serial No. contained in the signals representing the merchandise purchasing request.

Now, if necessary, an arrangement may be made wherein the CPU 31 of the corporation terminal 3 makes confirmation to the rating organization terminal device 6 regarding the reliability of the payment capabilities of the user 71 which has transmitted the merchandise purchasing request. In this case, the CPU 31 of the corporation terminal device 3 sends the serial No. contained in the signals representing the merchandise purchasing request to the corporation server 14 along with the confirmation request.

In step S48, the CPU 51 of the corporation server 14 sends the serial No. to be searched to the controller 16, via the internal bus 52 and network interface 53.

In step S49, the CPU 51 of the controller 16 searches the distribution firm 73 which has entered into contract with the corresponding community 81 from the community information database 22 and the corporation information database 24, and sends the search results thereof to the corresponding corporation terminal device 3, via the internal bus 52, network interface 53, corporation server 14, and the network 7.

In step S50, the CPU 31 of the corporation terminal device 3 sends signals to the corporation server 14 for commissioning shipping of the merchandise to the corresponding distribution firm 73, via the internal bus 33, input/output interface 32, network interface 35, and network 7.

In step S51, the CPU 51 of the corporation server 14 sends a merchandise shipping commission to the distribution firm terminal device 4 via the internal bus 52, network interface 53, distribution firm server 13, and the network 7, based on the input signals.

In step S52, the distribution firm terminal device 4 receives the merchandise shipping commission, generates signals for searching the address, name, etc., of the user 71 from the serial No., and sends this to the distribution firm server 13 via the internal bus 33, input/output interface 32, network interface 35, and network 7.

In step S53, the distribution firm server 13 receives input of the serial No., and sends this to the controller 16 via the internal bus 52 and network interface 53.

In step S54, the controller 16 searches personal information of the corresponding user 71 from the community information database 22 and user information database 21, based on the input serial No., and sends the searched results to the distribution firm terminal device 4 via the internal bus 52, network interface 53, distribution firm server 13, and the network 7.

In step S55, the CPU 31 of the distribution firm terminal device 4 receives input of the personal information of the user 71 to which the merchandise is to be delivered to via the network 7, network interface 35, input/output interface 32, and internal bus 33, and the processing ends.

Due to such processing, the user 71 can receive purchased merchandise without disclosing personal information of the user 71 such as address and name to the corporation 72, even in the event of purchasing merchandise from the corporation 72 online. Also, payment methods which can be used for paying for the merchandise include bank transfers, charging a specified bank account, settlement by credit card, COD, and various types of billing processing available on the Internet (e.g., prepaid services, credit card number pre-registration services, e-credit, etc.). Also, an arrangement may be made wherein the distribution firm 73 does not deliver the merchandise to the address of the user 71 but rather delivers to, for example, a convenience store which the user 71 specifies. In this case, the payment of the merchandise may be made by paying for the merchandise at the store at the time of picking up the merchandise.

Also, questionnaires from the corporation 72 can be gathered from the members of the community 81, using the present service. Next, the processing for a corporation 72 to commission the community 81 to carry out a questionnaire will be described with reference to the flowchart shown in FIG. 9.

In step S61, the CPU 31 of the corporation terminal device 3 accesses the corporation server 14 via the internal bus 33, input/output interface 32, network interface 35, and network 7.

In step S62, the CPU 51 of the corporation server 14 sends the input verification information of the corporation 72 to the verification server 15 via the internal bus 52 and network interface 53, and the CPU 51 of the verification server 15 executes verification processing based on the input verification information of the corporation 72.

In step S63, the CPU 31 of the corporation terminal device 3 sends to the corporation server 14 signals commissioning carrying out a questionnaire to the community 81 via the internal bus 33, input/output interface 32, network interface 35, and network 7. The questionnaire commission contains community attributes conditions (e.g., containing "automobile" in the keywords), and so forth. Also, in the event that the community 81 in which the questionnaire is to be carried out has be decided upon beforehand by searching the keywords, the questionnaire commission may contain a community name for identifying the community 81.

In step S64, the CPU 51 of the user server 11 receives the questionnaire commission via the corporation server 14, searches the community information database 22 if necessary, searches communities 81 corresponding to the questionnaire commission, and transfers the questionnaire commission to the user terminal device 2 of the owner of the corresponding community 81, via the internal bus 52, network interface 53, and network 7.

In step S65, the CPU 31 of the user terminal device 2 which the owner of the corresponding community 81 has receives input of the questionnaire commission from the corporation 72, via the network 7, network interface 35, input/output interface 32, and internal bus 33.

In step S66, the CPU 31 of the user terminal device which the owner has sends a questionnaire permission which the owner has input using the input unit 34 to the user server 11 via the internal bus 33; input/output interface 32, network interface 35, and network 7.

In step S67, the CPU 51 of the user server 11 transfers the questionnaire permission to the corporation terminal device 3, via the internal bus 52, network interface 53, corporation server 14, and network 7.

In step S68, the CPU 51 of the corporation terminal device 3 receives the input of the questionnaire permission, and sends the data corresponding to the questionnaire for the community 81 to the corporations server 14 via the internal bus 33, input/output interface 32, network interface 35, and network 7.

In step S69, the CPU 51 of the user server 11 receives from the corporation server 14 the input of data corresponding to the questionnaire which the corporation terminal device 3 has sent in step S68, and sends a broadcast e-mail containing the questionnaire from the corporation 72 to the e-mail addresses of all of the members of the corresponding community 81, via the internal bus 52, network interface 53, and network 7.

In step S70, the CPU 31 of the user terminal device 2 receives the e-mail containing the questionnaire which the corporation terminal device 3 sent in step S68, and displays the e-mail on the display unit 38. The user 71 makes reference to the display unit 38 and inputs a response to the input questionnaire using the input unit 34. The CPU 31 of the user terminal device 2 receives this data input, and returns the data to the user server 11 via the internal bus 33, input/output interface 32, network interface 35, and network 7.

In step S71, the CPU 51 of the user server 11 substitutes the personal address of the user 71 in the input response to the questionnaire with a serial No. that differs for each community, and transfers this to the corporation terminal device 3 which the corporation 72 that commissioned the questionnaire has, via the internal bus 52, network interface 53, corporation server 14, and network 7.

In step S72, the CPU 31 of the corporation terminal device 3 receives the response to the questionnaire via the network 7, network interface 35, input/output interface 32, and internal bus 33, and the processing ends.

Due to the above processing, the user 71 can reply to questionnaires from a corporation 72 without personal information being disclosed, and the corporation 72 can distribute questionnaires based on the attributes of the community 81 and accordingly can target specific market segments to poll. Further, it is expected that the percentage of response to the questionnaire will be higher, since the personal information of the user 71 is not disclosed.

Also, there are conceivably cases wherein a user 71 is a member in multiple communities 81, and in order to identify the same user 71 responding to the same questionnaire from multiple communities 81, an arrangement may be made wherein, for example, the results of performing computation with a hash function set by the community administration center 1 on the user ID and a text string predetermined by the corporation 72 are attached to the responses to the questionnaire. It is extremely difficult for a corporation 72 to take a user ID subjected to computation with a hash function and find the user ID upon which this is based, so the corporation 72 is able to distinguish users responding to the questionnaire without knowing the user ID.

Figure 9:
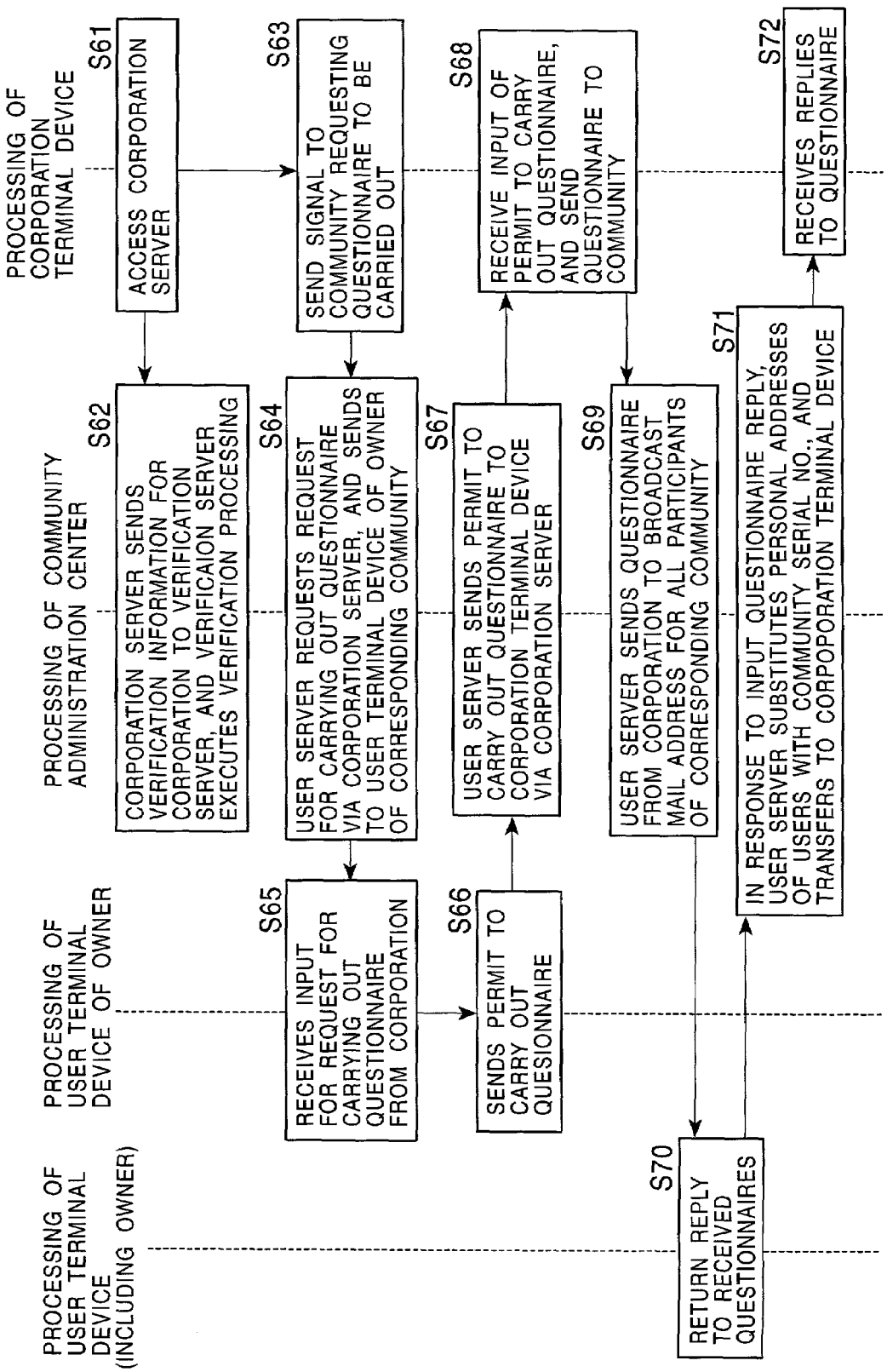
FIG. 9 is a flowchart describing the processing executed in the event of a corporation participating in the service commissioning the community to carry out a questionnaire.

Also, an arrangement may be made wherein the corporation 72 distributes not only questionnaires but also information regarding merchandise and events to the members of the community 81 upon receiving permission of the owner of the community 81, in the same manner as with the processing described with reference to FIG. 9.

Also, the community 81 is configured of members having the same interests or the like, so in a wine lovers community for example, the community might plan to purchase wine or cheese in bulk to get discounts. A community of people who like to go sightseeing might plan a tour together to reduce costs, or a community of audio equipment buffs might design accessories which are easier to use. All of these and other such uses can be easily realized by sing the communication functions provided by the present service. Accordingly, an arrangement may be made wherein the community 81 instead of individuals makes proposals to corporations 72 for plans the community 81 has made, including costs and the like, and in the event that the corporation 72 accepts the proposal, the members of the community 81 can purchase desired products at lower costs or receive services matching tastes and preferences, while the corporation 72 can gain an opportunity for selling merchandise and services.

Next, the processing executed in the event that the community 81 presents a proposal to a corporation 72 will be described with reference to the flowchart shown in FIG. 10.

In step S81 and step S82, processing the same as that in steps S21 and S22 in FIG. 7 is executed.

In step S83, the CPU 31 of the user terminal device 2 sends information representing opinions of a user 71 which the user 71 has input using the input unit 34 to the user server 11, via the internal bus 33, input/output interface 32, network interface 35, and network 7, using the communication functions which the community 81 provides, such as a mailing list or BBS, for example.

In step S84, the CPU 51 of the user server 11 provides the above-described communication functions to the members of the community 81, receives input of information sent by the user terminal device 2 in step S83 via the network 7, network interface 53, and internal bus 52. In the event that the communication function being used is a mailing list for example, broadcast mail is sent to the user terminal devices 2 which the members of the community 81 have via the internal bus 52, network interface 53, user server 11, and the network 7. In the event that the communication function being used is a BBS, input information is displayed as Web contents, for the members of the community 81 to view.

In step S85, the CPU 31 of the user terminal device 2 which the owner of the community 81 has sends the proposal of the community 81 for registering in the community proposal database 28 to the user server 11, via the internal bus 33, input/output interface 32, network interface 35, and network 7. Contents of the proposal of the community 81 are configured of, for example, contents of merchandise or service, price, deadline for reply, and the corporation to which the proposal is being made, and the corporation to which the proposal is being made may be a specific corporation by name, a particular business field, or not restricted in particular.

In step S86, the CPU 51 of the user server 11 sends signals representing the contents of the proposal of the community received from the owner of the community 81 via the network 7, network interface 53 and internal bus 52, to the controller 16, via the internal bus 52 and network interface 53.

In step S87, the CPU 51 of the controller 16 receives input of the signals representing the contents of the proposal of the community 81 via the network interface 53 and internal bus 52, and registers these in the community proposal database 28 via the internal bus 52 and network interface 53.

In step S88, the CPU 31 of the corporation terminal device 3 accesses the community proposal database 28 via the internal bus 33, input/output interface 32, network interface 35, network 7, corporation server 14, and controller 16. Or, an arrangement may be made wherein, instead of the corporation terminal device 3 accessing the community proposal database 28, the corporation server 14 generates Web contents enabling corporations 72 participating the present service to view a list of the contents of proposals registered in the community proposal database 28, and discloses the contents on the network 7, or automatically transmits e-mail containing the contents of the proposal to corporations 72 which match the criteria of the contents of the proposal of the community 81.

In step S89, the CPU 51 of the controller 16 counts the number of accesses of the corporation terminal device 3 to the community proposal database 28, and in step S90 executes billing processing. The billing processing in step S90 may be based on a flat rate per week or per month, or may be carried out by executing billing calculations to the corporations 72 having corporation terminal devices 3, based on a per-count charge system, with the calculation results being sent to the billing system 5 via the billing system interface 18. Also, the billing processing may be performed offline, with a log being kept in the controller 16, and batch processing being executed by the administrator of the community administration center 1 or an operator, once a week or once a month, i.e., on a predetermined time cycle.

In step S91, the CPU 31 of the corporation terminal device 3 receives input of signals indicating acceptance of the proposal of the community 81 from the input unit 34 via the input/output interface 32 and internal bus 33, and sends this to the controller 16 via the internal bus 33, input/output interface 32, network interface 35, network 7, and corporation server 14.

In step S92, the CPU 51 of the controller 16 notifies, via the internal bus 52, network interface 53, user server 11, and the network 7, the owner of the community 81, regarding an accepting corporation 72 which has sent the signals in step S91 indicating acceptance of the proposal of the community 81 via the internal bus 52, network interface 53, user server 11, and the network 7. That is, the sent signals are sent to the user terminal device 2 which the owner of the community 81 has, and the community proposal database 28 is updated via the internal bus 52 and network interface 53.

In step S93, the CPU 31 of the user terminal device 2 which the owner of the community 81 has, receives the notification of the corporation 72 which has accepted proposal via the network 7, network interface 35, input/output interface 32, and internal bus 33, and the processing ends.

Due to such processing, users 71 can propose desired merchandise and services to corporations 72 without allowing the corporations 72 to know personal information of the user 71, and since the proposal is from a group of multiple users 71 making up a community 81 and not an individual, the probability of the proposal being realized is greater. Also, the corporations 72 can know the needs of the users 71, and use this to increase sales.

Though the description has been made involving billing processing being carried out based on the number of accesses of the corporations 72 to the community proposal database, the billing processing may be based on, for example, the number of contracts completed or the amount of money involved in the contract.

Also, in addition to the corporations 72 receiving proposals from the users 71, the corporations 72 may make proposals to the community 81, such as a corporation 72 proposing, for example, to become a sponsor of the community 81, i.e., to run advertisements on the community 81 and pay advertising fees thereto.

Now, the processing executed in the case of a corporation 72 making a proposal to a community 81 for, for example, running advertisements on the community, will be described with reference to the flowchart shown in FIG. 11.

In steps S101 and S102, processing the same as that in steps S61 and S62 is executed.

In step S103, the CPU 31 of the corporation terminal device 3 sends signals commissioning the community 81 regarding a proposal for running advertisements for example, to the corporation server 14, via the internal bus 33, input/output interface 32, network interface 35, and network 7. Here, description will be made regarding a proposal for running advertisements, but this may be any other sort of proposal, such as an invitation to participate in an event, recruiting monitors, and so forth.

Also, signals commissioning the community 81 regarding such proposals include, for example, the contents of the proposal, community name for identifying the community, community ID, community attributes, the number of participants or communities invited, or the like.

In step S104, the CPU 51 of the controller 16 receives input of the commission to run advertisements via the corporation server 14, and registers this in the corporation proposal database 27 via the internal bus 52 and network interface 53.

In step S105, the CPU 31 of the user terminal device 2 which the owner of the corresponding community 81 has accesses the corporation proposal database 27 via the internal bus 33, input/output interface 32, network interface 35, network 7, user server 11, and controller 16. Or, an arrangement may be made wherein, instead of the user terminal device 2 accessing the corporation proposal database 27, the user server 11 generates Web contents enabling the owner or members of the community 81 to view a list of the contents of proposals registered in the corporation proposal database 27, and discloses the contents on the network 7, or wherein the corporation 72 automatically transmits e-mail commissioning running of advertisements to communities 81 which the corporation 72 desires.

In step S106, CPU 31 of the user terminal device 2 which the owner has sends to the user server 11 a permission to run advertisements, input by the owner using the input unit 34, via the internal bus 33, input/output interface 32, network interface 35, and network 7.

In step S107, the CPU 51 of the user server 11 notifies the controller 16 via the internal bus 52 and network interface 53 that the community 81 has issued a permit to run advertisements, and updates the corporation proposal database 27. An arrangement may be made wherein, in the event that the corporation 72 desires to run advertisements on multiple communities, the corporation proposal database 27 lists the remaining number of communities to carry advertisements as proposed by the corporation 72.

In step S108, the CPU 51 of the controller 16 creates an e-mail address dedicated to running advertisements, and transmits this to the corporation terminal device 3 via the internal bus 52, network interface 53, corporation server 14, and network 7.

In step S109, the CPU 31 of the corporation terminal device 3 receives the permission to run advertisements and the e-mail address dedicated to running advertisements, and sends an advertisement to the community 81 using the dedicated address, via the internal bus 33, input/output interface 32, network interface 35, and network 7. Though the description here involves advertisements being sent using e-mail, an arrangement may be made wherein so-called banner advertisements are run on a BBS of the community 81.

In step S110, the CPU 51 of the user server 11 receives via the corporation server 14 input of data corresponding to the advertisement addressed to the dedicated address, and makes a broadcast transmission of the advertisement from the corporation 72 to the e-mail addresses of all members of the community 81, via the internal bus 52, network interface 53, and network 7.

In step S111, the CPU 31 of the user terminal device 2 receives the advertisement sent from the corporation 72 in step S110, and displays this on the display unit 38.

In step S112, the CPU 51 of the user server 11 sends the number of advertisements distributed, to the controller 16, via the internal bus 52 and network interface 53.

In step S113, the CPU 51 of the controller 16 counts the number of advertisements distributed, performs billing processing in step S114, and the processing ends. As described with reference to FIG. 10, the billing processing in step S114 may, for example, be based on a flat rate per week or per month, or may be carried out by executing billing calculations to the corporations 72 having corporation terminal devices 3, based on a per-count charge system, with the calculation results being sent to the billing system 5 via the billing system interface 18. Also, the billing processing may be performed offline, with a log being kept in the controller 16, and batch processing being executed by the administrator of the community administration center 1 or an operator, once a week or once a month, i.e., on a predetermined time cycle.

Further, though the description here has been made involving billing processing being carried out based on the number of advertisements distributed to the members of the community 81, the billing processing maybe based on, for example, the number of products or services sold, or sales. Also, in the event that the advertisement is a banner advertisement on a BBS, arrangements may be made wherein billing calculation is performed based on the period run, on a click-through count, the number of products or services sold, sales, and so forth.

Due to the processing described above, corporations 72 can run advertisements while targeting specific market segments, and thus can increase advertisement efficiency while keeping costs down. On the other hand, the community 81 can obtain advertising fees and also select advertisements which match the interests of the community 81, so information relating to areas of interest and newest products and the like can be obtained quickly.

The above-described series of processing can be executed by software. Such software is installed in, for example, a general-purpose personal computer capable of executing various types of functions, by installing programs making up the software from recording media, or a computer may be provided with the programs making up the software installed in dedicated hardware provided therein.

The recording medium is, as shown in FIGS. 3 and 4, packaged media distributed separately form the computer for providing the programs to users, such as magnetic disks 41 and 61 (including floppy disks), optical disks 42 and 62 (including CD-ROMs (Compact Disk Read-Only Memory) and DVDs (Digital Versatile Disks)), magneto-optical disks 43 and 63 (including MDs (Mini-Disks), semiconductor memory 44 and 64, and so forth.

Incidentally, the steps described in the programs recorded in the recording media may be executed according to time-sequence in the order described in the present specification, of course, but the present invention also includes processing wherein the steps are executed not in time-sequence but in parallel or individually, as well.

Note that in the present specification, the term "system" represents the entire equipment made up of multiple devices.

According to the above-described information processing device, information processing method, service providing system, and computer-executable program, individuals can exchange information with corporations via a community which is a group of individuals sharing common interests and objects, without disclosing personal information to the corporations, and enable corporations to transmit advertisements to individuals or take questionnaires for example, via the community, so that the corporations can target market segments without the individuals disclosing personal information to the corporations.

What is claimed is:

1. A service providing system, comprising:

a first information processing device which executes processing of a plurality of information relating to the activity of a community comprising a plurality of users;

second information processing devices which said users have;

third information processing devices which corporations have; and a fourth information processing device which a third-party organization for monitoring the activity of said community has;

said first information processing device comprising:

a first recording control means for controlling recording of information relating to said community made up of said plurality of users;

a communication service providing means for providing communication services to said plurality of users making up said community, and a first input/output control means for controlling input and output of information to and from said second through said fourth information processing devices;

a conversion means for converting personal information of at least on said users contained in a first information of which input is controlled by said first input/output control means with a second information, the second information being generic group information corresponding to a predetermined group to which said user belongs;

a substituting means for substituting personal information of the at least one said users contained in a first information with the second information, prior to sending the first information to another information processing device, the second information also corresponding to said personal information of said user on a one-to-one basis;

a searching means for locating the personal information corresponding to the second information prior to sending a reply, to said first information, from said another information processing device to said first information processing device;

said second information processing device comprising:

a second input/output control means for controlling input and output of information to and from said first information processing device;

said third information processing device comprising:

a third input/output control means for controlling input and output of information to and from said first information processing device, wherein said third input/output control means control output of sending request for reliability information of said community to said fourth information processing device via said first information processing device; and said fourth information processing device comprising a fourth input/output control means for controlling input and output of information to and from said first information processing device, and a generating means for generating said community reliability information based on information relating to said community regarding which recording is controlled by said first recording controlled means, regarding which input is controlled by said fourth input/output control means, wherein said fourth input/output control means control input of requests sent for said community reliability information, and control output of said community reliability information to said third information processing device via said first information processing device.

2. A service providing system according to claim 1, wherein substituting the second information conceals the identity of the user.

* * * * *